(12) United States Patent
Welinder et al.

(10) Patent No.: US 10,628,519 B2
(45) Date of Patent: Apr. 21, 2020

(54) ENHANCING DOCUMENTS PORTRAYED IN DIGITAL IMAGES

(71) Applicant: DROPBOX, INC., San Francisco, CA (US)

(72) Inventors: Nils Peter Welinder, San Francisco, CA (US); Peter N. Belhumeur, San Francisco, CA (US); Ying Xiong, Sunnyvale, CA (US); Jongmin Baek, San Jose, CA (US); Simon Kozlov, San Francisco, CA (US); Thomas Berg, San Francisco, CA (US); David J. Kriegman, San Diego, CA (US)

(73) Assignee: Dropbox, Inc., San Francisco ( * ) Notice: Subject to any disclaimer, the term of this patent is extended or adjusted under 35 U.S.C. 154(b) by 0 days.

(21) Appl. No.: 15/658,289

(22) Filed: Jul. 24, 2017

(65) Prior Publication Data
US 2018/0024974 A1 Jan. 25, 2018

Related U.S. Application Data

(60) Provisional application No. 62/365,914, filed on Jul. 22, 2016.

(51) Int. Cl.
*G06F 17/00* (2019.01)
*G06F 17/24* (2006.01)
(Continued)

(52) U.S. Cl.
CPC ............. *G06F 17/24* (2013.01); *G06F 16/93* (2019.01); *G06F 17/212* (2013.01);
(Continued)

(58) Field of Classification Search
CPC ...... G06F 17/24; G06F 17/212; G06F 17/211; G06F 17/2288; G06F 17/241;
(Continued)

(56) References Cited

U.S. PATENT DOCUMENTS 6,671,684 B1 12/2003 Hull et al.
8,832,549 B2 9/2014 Mansfield et al.
(Continued)

OTHER PUBLICATIONS

Khan, Z.H.; Aurangzeb, M.; "Real Time Object Tracking Using BMA"; Source: First International Conference on Information and Communication Technologies, 2005; Print ISBN: 0-7803-9421-6; DOI: 10.1109/ICICT.2005.1598555.
(Continued)

*Primary Examiner* — Quoc A Tran
(74) *Attorney, Agent, or Firm* — Keller Jolley Preece

(57) ABSTRACT

Systems and methods that efficiently and effectively generate an enhanced document image of a displayed document in an image frame captured from a live image feed are disclosed. For example, systems and methods described herein apply a document enhancement process to a displayed document in an image frame that result in an enhanced document image that is cropped, rectified, un-shadowed, and with dark text against a mostly white background. Additionally, systems and method described herein determine whether a stored digital content item includes a displayed document. In response to determining that a stored digital content item does include a displayed document, systems and methods described herein generate an enhanced document image of a displayed document included in the stored digital content item.

20 Claims, 27 Drawing Sheets

(51) Int. Cl.
*G06F 17/21* (2006.01)
*G06T 7/194* (2017.01)
*G06T 11/00* (2006.01)
*G06F 17/22* (2006.01)
*G06K 9/00* (2006.01)
*G06F 16/93* (2019.01)
*G06T 5/00* (2006.01)
*G06K 9/46* (2006.01)
*G06K 9/78* (2006.01)
*G06F 3/0484* (2013.01)
*G06K 9/40* (2006.01)
*G06K 9/32* (2006.01)
*G06T 11/60* (2006.01)
*G06F 3/12* (2006.01)

(52) U.S. Cl.
CPC ...... *G06F 17/2205* (2013.01); *G06F 17/2288* (2013.01); *G06K 9/00442* (2013.01); *G06K 9/00456* (2013.01); *G06K 9/00463* (2013.01); *G06K 9/00744* (2013.01); *G06K 9/4604* (2013.01); *G06K 9/78* (2013.01); *G06T 5/007* (2013.01); *G06T 7/194* (2017.01); *G06T 11/001* (2013.01); *G06F 3/04842* (2013.01); *G06F 3/126* (2013.01); *G06F 17/211* (2013.01); *G06F 17/241* (2013.01); *G06K 9/00483* (2013.01); *G06K 9/3208* (2013.01); *G06K 9/40* (2013.01); *G06T 5/002* (2013.01); *G06T 11/60* (2013.01); *G06T 2207/20056* (2013.01); *G06T 2207/20081* (2013.01); *G06T 2207/20084* (2013.01); *G06T 2207/30176* (2013.01); *G06T 2210/22* (2013.01)

(58) Field of Classification Search
CPC ..... G06F 16/93; G06F 3/126; G06K 9/00463; G06K 9/004546; G06K 9/00442; G06K 9/00483; G06T 11/60
See application file for complete search history.

(56) References Cited

U.S. PATENT DOCUMENTS

| | | |
|---|---|---|
| 9,105,011 B2 | 8/2015 | Calman et al. |
| 9,280,691 B2 | 3/2016 | Kleinman |
| 9,305,402 B2 | 4/2016 | Bilbrey et al. |
| 2005/0100209 A1* | 5/2005 | Lewis ............... G06K 9/6217 382/159 |
| 2010/0060915 A1* | 3/2010 | Suzuki ............. G06K 9/00684 358/1.9 |
| 2012/0238254 A1 | 9/2012 | Yankovich et al. |
| 2013/0083003 A1 | 4/2013 | Perez et al. |
| 2013/0113943 A1 | 5/2013 | Wormald et al. |
| 2013/0182970 A1* | 7/2013 | Shustorovich ......... H04N 1/387 382/274 |
| 2014/0072201 A1* | 3/2014 | Tilt .................... H04N 5/23293 382/140 |
| 2014/0297256 A1 | 10/2014 | Rogowski et al. |
| 2016/0071319 A1 | 3/2016 | Fallon et al. |
| 2016/0309085 A1 | 10/2016 | Ilic |
| 2016/0328607 A1 | 11/2016 | Krishnan |
| 2018/0025251 A1 | 1/2018 | Welinder et al. |

OTHER PUBLICATIONS

Kim, J.; Seitz, S.; Agrawala, M.; "Video-based document tracking: Unifying your physical and electronic desktops"; Source: UIST: Proceedings of the Annual ACM symposium on User interface Software and Technology, 2004.

Porzik, L.; Ricci, E.; Ciarfuglia, T.; Zanin, M.; "Visual-inertial tracking on Android for Augmented Reality applications"; Source: 2012 IEEE Workshop on Environmental Energy and Structural Monitoring Systems; Electronic ISBN: 978-1-4673-2738-1; DOI: 10.1109/EESMS.2012.6348402.

U.S. Appl. No. 15/658,291, Oct. 16, 2018, Office Action.
U.S. Appl. No. 15/658,291, Apr. 15, 2019, Office Action.

* cited by examiner

404

1. Background
- Neutralization is the elimination of phonological contrast in certain phonetic environments. One of the major examples in Russian is devoicing.
- Devoicing is the process of changing of a voiced consonant to an unvoiced consonant.
- In Russian this can happen due to assimilation, or word final position of the consonant, this study focuses on the latter.
- Former studies focused on devoicing in languages such as Dutch and German, but there have not been as many on Russian devoicing.
- This study also aims to define the influence of L2 English on L1 Russian speakers devoicing as well as L2 Russian acquisition of final devoicing.

2. Method
- Subjects:
  o 11 native Russian speakers. 7 of those 11 had English as a second language, while the other 4 lived in Russia and had minimal exposure to English.
  o 9 native English speakers learning Russian. 5 were students, 3 teachers and one family member of a professor.
- Stimuli
  o The stimuli consisted of 34 word pairs that had underlying differences in the voicing of the final consonant.

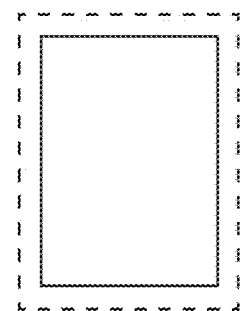
4 corners, 4 edges
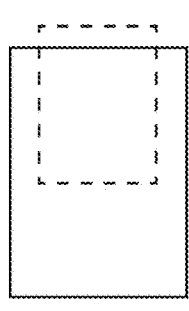
0 corners, 1 edge
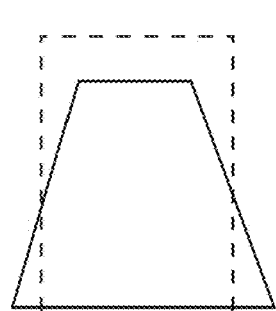
2 corners, 0 edges
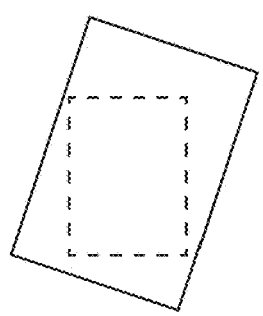
0 corners, 0 edges
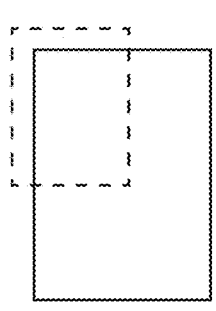
1 corner, 2 edges
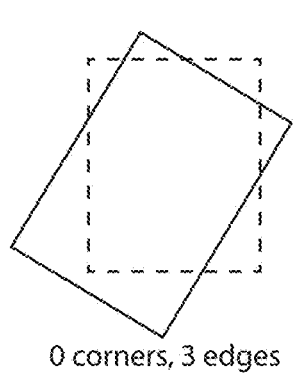
0 corners, 3 edges
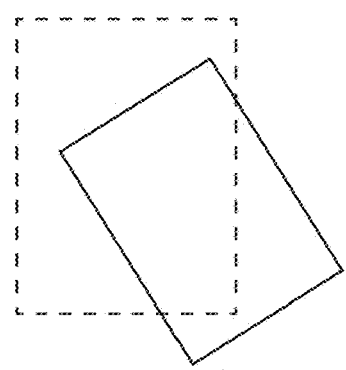
2 corners, 3 edges
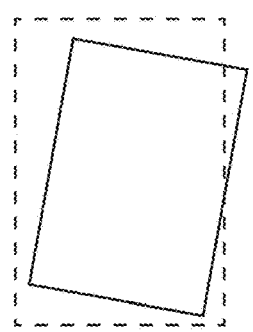
3 corners, 4 edges
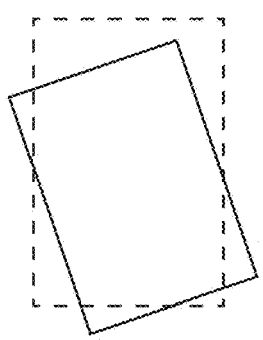
1 corner, 4 edges
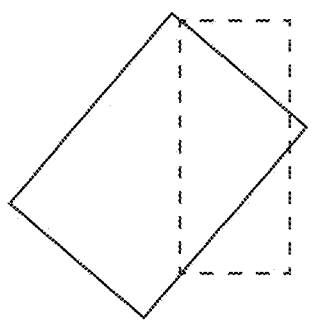
0 corners, 2 edges
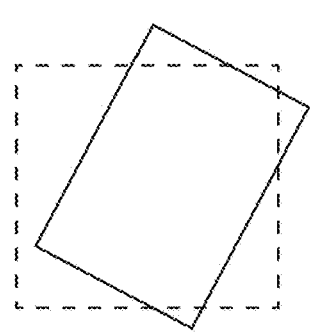
1 corner, 3 edges
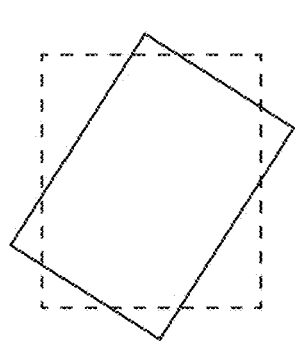
0 corners, 4 edges
*Fig. 4B*

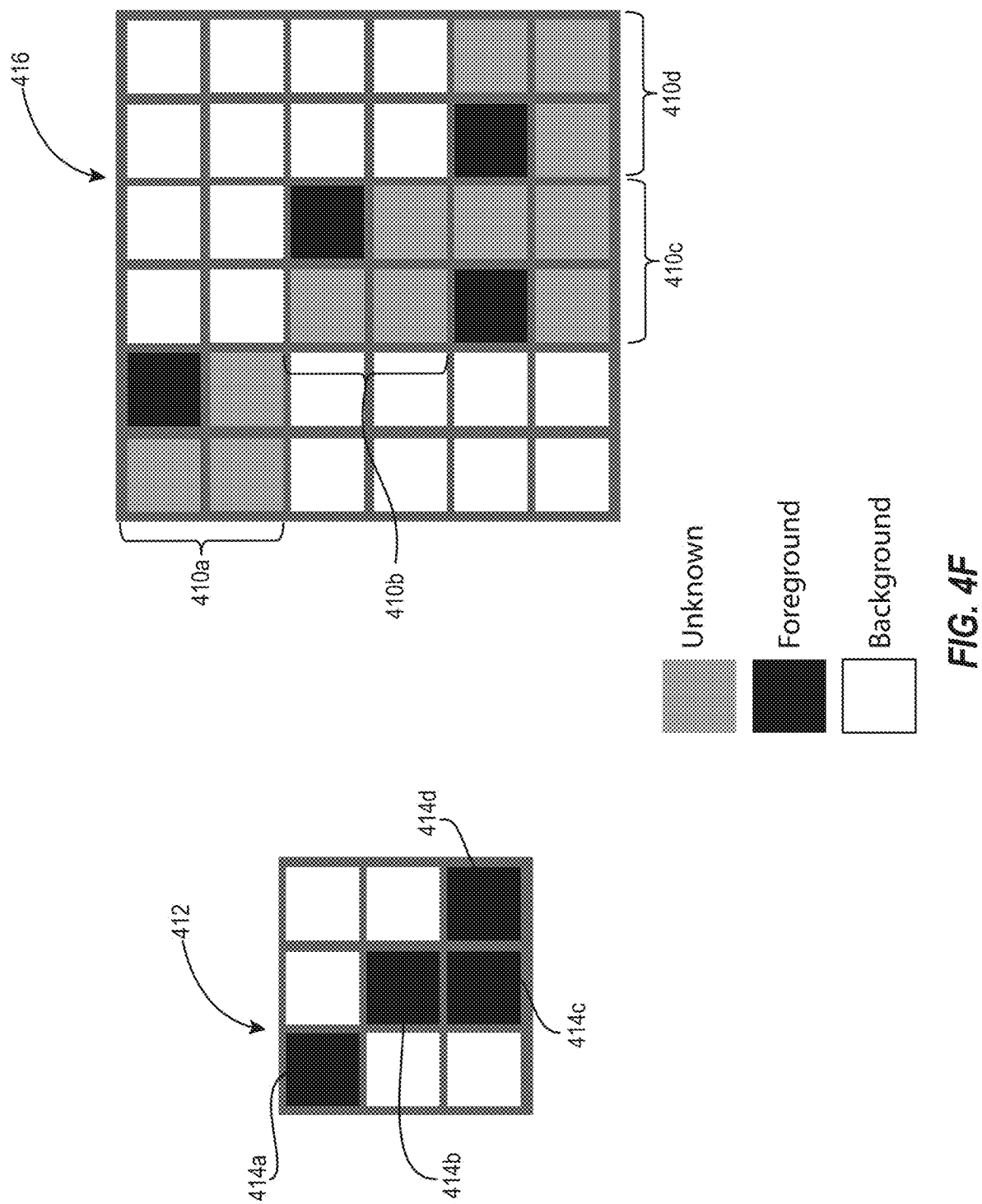

"Convolutional layer of 5 3x3 filters with stride 2"
9x9x3 input -> 4x4x5 ouput
parameters: filter weights

Pooling Layer
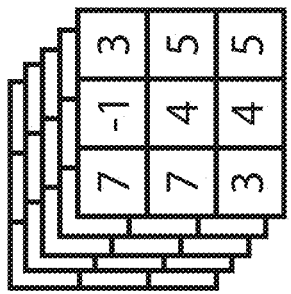
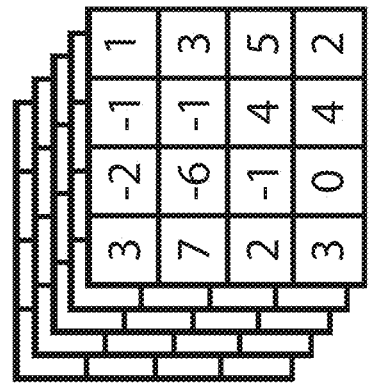
Max Pool
"2x2 Max-pooling with stride 1"
4x4x5 input -> 3x3x5 ouput
parameters: none
FIG. 7B Elementwise Nonlinearity Layer Rectified Linear Unit (ReLU)

No change to dimensions
parameters: none

ENHANCING DOCUMENTS PORTRAYED IN DIGITAL IMAGES

CROSS REFERENCE TO RELATED APPLICATIONS

This application claims the benefit of and priority to U.S. Provisional Application No. 62/365,914, filed Jul. 22, 2016, the entire contents of which are hereby incorporated by reference.

BACKGROUND

Online or "cloud" storage is a popular and easy way for computer users to store electronic media without the need to physically connect to a storage device. For example, it is common for a user to capture digital photographs and videos on a smart phone, and to store the captured media items in the "cloud." Furthermore, users frequently utilize online storage for storing more than digital photographs and videos. For instance, users often utilize online storage to save electronic document files (e.g., word processor files, spreadsheet files, and/or other electronic files).

In addition to saving digital photos, digital videos, and electronic document files to online storage, in many cases a user wishes to save physical documents (e.g., paper receipts, invoices, pay stubs, bills, reports, and so forth) to online storage. Unlike digital photographs, videos, and other electronic files that are in a digital format, in order to eventually save a physical document to online storage, the physical document must first be digitized (i.e., changed from a physical object to digital data. Conventional systems have several disadvantages when attempting to digitize a physical document to save on an online storage system.

One disadvantage is that conventional systems often need multiple acts and various hardware devices. To illustrate, in some conventional systems, a user utilizes a flatbed scanner to digitize a physical document. Conventional systems that use a flatbed scanner have several disadvantages. First, in utilizing a flatbed scanner, the user often must store physical documents until being able to access a flatbed scanner (e.g., at an office). Furthermore, the user has to scan the physical documents, save the scanned document to the user's local computer device, and then upload the scanned document to online storage. The flatbed process of scanning, saving, and uploading documents is frustrating for users.

Due to the disadvantages of using a flatbed scanner, some users take a digital photo of a physical document they wish to store digitally, and upload the digital photo to online storage. Various problems exist, however, with this conventional approach to storing physical documents. For example, a digital photo in a picture file format (e.g., JPEG, GIF) is typically a much larger data file compared to file formats for electronic documents. Thus, physical documents that are digitized in a picture file format use excessive storage resources that can result in limited available storage space. Moreover, because larger data files take longer to download from an online storage system, storing physical documents in a picture file format typically results in longer file access times (e.g., the amount of time for a client device to access a file on the online storage). In addition, picture file formats are often not compatible with document applications within which the physical document is intended to be used, such as accounting applications, electronic document applications, and so forth.

While some conventional systems are able to convert a digital photo to a document file format, traditional file converters use significant amounts of processor resources to make the conversion. Due to the significant use of processor resources, many file converters need more processor power than is available on a typical mobile device. Due to the processor intensive process of converting a digital photo in a picture file format to a document file format, a user can first download a digital photo of the physical document to a non-mobile computing device (e.g., desktop or laptop computer) that has adequate processor power. Thus, conventional file conversion systems often require significant processing resources not available on many mobile devices.

As another disadvantage, conventional systems that save a digital photo of a physical document often result in a poor-quality representation of the physical document. For example, when taking a photo of a physical document with a mobile phone camera, a user often holds the camera at an angle with respect to the physical document. Thus, the document in the resulting photo appears skewed. In addition, with conventional systems, the user may hold the camera too close to the physical document or too far away from the physical document, which may result in not capturing portions of a physical document, or capturing portions of a physical document that are unreadable.

In addition to the above-referenced quality issues, conventional systems often generate representations of documents that include shadows, glares, or other forms of non-uniformities that are typically not present in most physical documents. For example, a white sheet of paper is uniformly white across the entire sheet, but due to lighting, the position of the camera, and other factors, conventional systems generate a representation of the white sheet that includes dark spots in one or more portions of the white sheet. These types of non-uniformities not only decrease the aesthetic of the document, but they also affect the readability and clarity of information (e.g., text) included within a shadow portion a document.

Moreover, conventional systems often capture an image of a physical document, where the image not only includes a representation of the physical document, but also includes background objects. For example, a user can take a digital photo of a physical document that results in capturing not only an image of the physical document, but also captures a table surface on which the physical document rests. Many conventional systems are not able remove the background objects, thus resulting in a representation of a physical document that includes distracting backgrounds or objects not part of the physical document.

SUMMARY

One or more embodiments of this disclosure solve one or more of the foregoing or other problems in the art by providing systems and methods for converting a displayed document within a digital image to an electronic document format. For instance, the systems and methods convert a representation of a real-world physical document portrayed within a digital photo to a portable document format (i.e., PDF). In some examples, the systems and methods generate an enhanced document image of a displayed document within a digital image by performing enhancement processes to correct visual flaws of the displayed document (e.g., colors, shadows, contrast, skew, etc.). In addition, various embodiments of the systems and methods convert the enhanced document image to an electronic file format for presentation on a client device and/or direct upload to an online content management system. Thus, examples of the systems and methods provide a user with a high quality electronic document file corresponding to a displayed document within a digital image.

Furthermore, one or more embodiments of the present disclosure provide systems and methods to identify displayed documents within a digital image maintained on an online content management system. For example, the systems and methods analyze a digital image to determine whether the digital image includes a displayed document. In response to determining that a digital image includes a displayed document, the systems and methods provide a user of a client device an option to generate an enhanced document image for the displayed document, and convert the enhanced document image to an electronic document file format that a user can access on the online content management system.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 4A-4G illustrate example processes of the document enhancement process in accordance with one or more embodiments described herein;

FIGS. 7A-7D illustrate example layers of a convolutional neural network for classifying images in accordance with one or more embodiments described herein;

DETAILED DESCRIPTION

Figure 1:
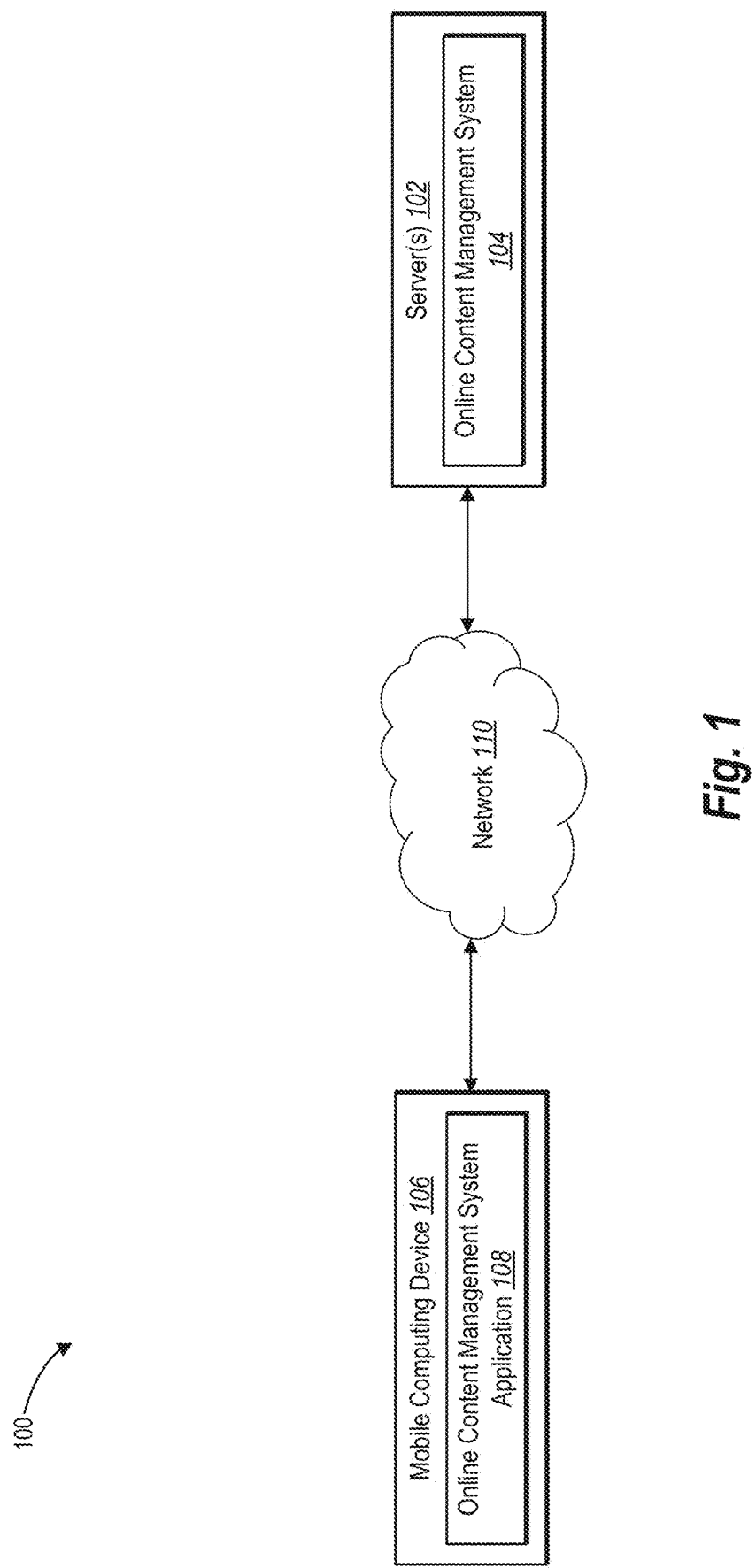
FIG. 1 illustrates a schematic diagram of an environment for implementing the document enhancement system in accordance with one or more embodiments described herein.

One or more embodiments described in this disclosure provide a document enhancement system for converting a displayed document within a digital image to an electronic file format. For example, in some embodiments, the document enhancement system can detect a displayed document within a live image feed associated with a client device (e.g., a mobile device camera feed), and convert the displayed document into an electronic document file. Furthermore, in one or more embodiments, the document enhancement system can analyze a digital content item maintained within a repository (e.g., an online content management system) to determine the digital content item portrays a displayed document. Based on determining the digital content item includes the displayed document, the document enhancement system provides an option to a user to convert the displayed document into an electronic document file format.

As mentioned, in one or more embodiments, the document enhancement system converts a displayed document within a digital image to an electronic document format. For example, the document enhancement system can detect a displayed document portrayed within a digital image, and can generate an enhanced document image corresponding to the displayed document. For instance, to generate the enhanced document image, the document enhancement system corrects visual flaws of the displayed document (e.g., colors, shadows, contrast, skew, etc.). In addition, the document enhancement system converts the enhanced document image to an electronic file format that a client device can present to a user and/or upload to an online content management system. Accordingly, one or more embodiments of the document enhancement system converts a representation of a real-world physical document portrayed within a digital image into an electronic document file format (i.e., PDF).

The document enhancement system can perform various processes to convert a displayed document within a digital image into an electronic document file format. For example, the document enhancement system can detect a displayed document within a digital image. In one or more embodiments, document enhancement system receives a digital image in the form of an image frame from a live image feed (e.g., a viewfinder image feed from a mobile device camera). For example, the document enhancement system receives an image frame in response to a user of a mobile device selecting a shutter button associated with a live image feed from a camera on the mobile device. In at least one embodiment, the document enhancement system identifies a displayed document portrayed in the image frame, or in other words, the digital document enhancement system detects a digital representation of a real-word physical document within the image frame.

Furthermore, in at least one embodiment, the document enhancement system crops an image frame with respect to a displayed document within the image frame. For example, the document enhancement system crops the image frame by determining a boundary (e.g., perimeter) of the displayed document, and removing portions of the image frame located outside the boundary. In addition to cropping the image frame, the document enhancement system can rectify the displayed document within the cropped image frame to resolve orientation and skew problems of the displayed document to generate a displayed document having a boundary that approaches, or has, a square or rectangle shape.

Moreover, in some embodiments, the document enhancement system reduces and/or corrects any uneven lighting, shadows, glares, grainy or unclear foreground, or other visual abnormalities that may be present within the displayed document. To correct the various visual abnormalities, the document enhancement system converts the displayed document to grayscale (e.g., removing any color within the displayed document). Using the grayscale version of the displayed document, the document enhancement system processes the grayscale version to denoise the displayed document, as will be explained further below.

Based on reducing and/or correcting any visual informalities within the displayed document, the document enhancement system can perform various additional processes to further enhance the displayed document. In one or more embodiments, the document enhancement system transforms the displayed document into various forms or domains to reduce computational complexities and time for enhancement processes so the document enhancement system can perform the document enhancement in an efficient manner. In some cases, and as will be explained further below, the document enhancement system transforms the displayed document to reduce the computational complexities of the enhancement process so that a mobile device can efficiently perform the document enhancement process.

In addition to the above processes, the document enhancement system further enhances the displayed document to create a version of the displayed document that includes a foreground (e.g., text) that is crisp and visible with high contrast to the background. Moreover, the document enhancement system further creates or generates a background within the displayed document having a uniform gradient that is white or near white. After optimizing the contrast between the background and the foreground, the document enhancement system restores any lost resolution resulting from transformations made to simplify the computational complexities of enhancing the displayed document. Furthermore, the document enhancement system can square the borders of the displayed document and recolor the displayed document (e.g., because the image was converted to grayscale).

Based on one or more of the above-described process, which will be discussed in detail below, the document enhancement system provides an enhanced document. For instance, the document enhancement system provides as an out an enhanced document image that appears as though a user utilized a flatbed scanner to digitize a real-world physical document (e.g., a "scanned quality"). At this point, the document enhancement system can convert the enhanced document image to an electronic file format, such as a PDF document.

Additionally, in one or more embodiments, the document enhancement system also identifies previously captured digital content items that a user may want to convert to an electronic file format. For example, in at least one embodiment, the document enhancement system determines whether a digital content item portrays a displayed document. If document enhancement system determines that a stored digital content item includes a displayed document, the document enhancement system provides, to a client device, a selectable graphical element (e.g., a selectable button) associated with the digital content item. The user can select the selectable graphical element, and in response, the document enhancement system generates an enhanced document image for the displayed document using one or more of the enhancement processes described above.

In some embodiments, the document enhancement system accesses digital content items stored in a data repository. For example, a user of a mobile device can have an account with an online content management system where the user stores various types of digital content items (e.g., digital photographs, PDF files, word processing files, spreadsheet files, etc.). Accordingly, in at least one embodiment, document enhancement system determines whether a digital content item stored within a user's account on the online content management system includes a displayed document, and is therefore "scannable." As mentioned above, upon determining that a digital content item on the online content management system includes a displayed document, the online content management system can communicate with a client device (e.g., via an online content management system application on the client device) to generate an enhanced document for conversion into an electronic file format that a user can access on the online content management system.

To identify whether a previously captured digital content item portrays a displayed document, some embodiments of the document enhancement system includes an image classifier. For example, the image classifier determines if a digital content item is scannable in response to identifying a displayed document in the digital content item. Conversely, the image classifier determines a digital content item is not scannable in response to not identifying a displayed document in the digital content item. In one or more embodiments, and as will be explained in detail below, the image classifier utilizes a trained neural network to determine whether a digital content item is scannable or not scannable.

The above-described functions and features of the document enhancement system, as well as the additional details below, provide several advantages over conventional systems. For example, when compared to conventional systems that require multiple acts and various hardware devices, document enhancement system enables a user to utilize a handheld computing device to "scan" a document to cloud storage in a single step. Thus, in one example, the user can scan, store, and throw away a restaurant receipt before leaving the restaurant. Accordingly, document enhancement system eases the burden on users to store and maintain physical copies of documents.

Additionally, document enhancement system utilizes processor optimized methods that do not overburden the processing capabilities of a handheld computing device, such as a mobile phone. Therefore, users can scan and store documents quickly wherever they go. Furthermore, while conventional systems store representations of documents that are virtually unreadable (e.g., due to lighting problems, skew, and other noise) the document enhancement system includes additional methods that justify, color-correct, remove shadows, crop, and generally produce a scanned image that is clear, evenly illuminated, and easily readable. As mentioned above, document enhancement system performs these methods in an optimized manner that reduces the amount of computing resources required to produce a live boundary indicator, and therefore, a mobile computing device can provide a boundary indicator at a rate that generates little to no lag with respect to an image feed (e.g., a mobile device's camera image feed).

Moreover, document enhancement system also conserves computing resources by determining whether a saved image is "scannable" or not. As described above, document enhancement system determines that a picture of a dog, for example, is not an image that may be "scanned," and accordingly, does not give the user an option to scan the picture of the dog. Conversely, document enhancement system also determines that a picture of a document (e.g., a restaurant receipt) is an image that may be "scanned," and gives the user the option to scan the picture to scanned document quality. Thus, document enhancement system streamlines the scanning process by performing this first determination step for the user.

This disclosure refers to various terms to describe the functions and features of one or more embodiments of a document enhancement system. As used herein, a "physical document" refers to a real-world object used to convey information. For instance, a physical document can include real-word objects that include printed text, handwritten text, drawings, figures, diagrams, or other forms of information. Various examples of physical documents include paper-type documents such as a piece of paper, a receipt, a pamphlet, a book page, a notepad, a menu, an envelope, a holiday card, a business card, etc. Physical documents further can include a whiteboard, chalkboard, or other types of writing surfaces. In yet other examples, a physical document can include an image of a computer monitor, television screen, projector display, or other presentation mediums. As is appreciated based on the disclosure herein, other examples of physical documents exist that benefit from the systems and method described herein.

As used herein, an "image feed" includes a feed of digital image frames for presentation on a screen or monitor of a computing device. For instance, an image feed can include a feed from a digital camera of a computing device. In other examples, an image feed can include a previously captured feed. In addition, in some embodiments, the image feed can include streaming video, a presentation of saved video, or other digital content that includes a presentation of a series of multiple image frames. An image feed can have various frame rates, or in other words, the rate at which image frames are displayed upon presentation of an image feed. As is understood based on this disclosure, an "image frame," as used herein, is a defined portion or instance of digital content included within an image feed. For example, an image feed generally includes multiple successive image frames that, when presented in succession, can provide a video-type presentation.

As used herein the term "displayed document" refers to a depiction of a physical document within a digital image. For example, a displayed document can include a visual representation of a physical document within an image frame of an image feed, or within an image feed itself (e.g., a camera viewfinder image feed). In addition, a displayed document can include a representation of a physical document within a captured digital photo (e.g., a digital photo that the document identification system converts to a document file). In some embodiments, a displayed document does not include an entire physical document, but rather only includes a portion of a physical document. Accordingly, and in general, a displayed document includes a visual digital depiction of at least a portion of a physical document.

As used herein, an "enhanced document image" refers to an output image from a document enhancement process. In one or more embodiments, an enhanced document image is an image of a displayed document that has been edited, modified, altered, etc. so as to appear as a digital document created using a flatbed scanner. For example, an enhanced document image can include dark, clear text against a mostly white, evenly illuminated, and clean background. It will be understood that while the document enhancement process is described herein as acting in combination with a displayed document, the acts of the document enhancement process actually act in combination with an image of a displayed document as detected within an image frame taken from a live image feed or stored digital content item.

Additional details of various example embodiments of the document enhancement system will not be discussed with respect to the figures. FIG. 1 is a schematic image illustrating an example embodiment of document enhancement system 100. As illustrated in FIG. 1, document enhancement system 100 includes server 102 including online content management system 104. Furthermore, document enhancement system 100 also includes mobile computing device 106 on which online content management system application 108 is installed.

In at least one embodiment, mobile computing device 106 and server 102 are communicatively coupled across network 110. Although FIG. 1 illustrates a particular arrangement of mobile computing device 106, server 102, and network 110, various other arrangements are possible. For example, mobile computing device 106 may directly communicate with server 102, bypassing network 110. Additionally, in one or more embodiments, mobile computing device 106 may not include online content management system application 108, but rather may utilize the features of document enhancement system 100 via a native application or web application.

Although one or more embodiments are described herein as including mobile computing device 106 (e.g., a smartphone), in additional embodiments, document enhancement system 100 can operate in combination with any type of client computing device. For example, in an additional embodiment, rather than including mobile computing device 106, document enhancement system 100 can include a client computing device such as a laptop, desktop, tablet, smartwearable, etc. Additional examples and features of client computing devices are described below with reference to FIGS. 12 and 13.

Mobile computing device 106 and server 102 may communicate using any communication platform or technology suitable for transporting data and/or communication signals. For example, mobile computing device 106 and server 102 may communicate via any known communication technologies, devices, media, and protocols supportive of remote data communications, examples of which are described below with respect to FIGS. 12 and 13. In addition, in certain embodiments, mobile computing device 106 may communicate via network 110 with server 102. Network 110 may be any suitable network over which mobile computing device 106 may access server 102, or vice versa. Network 110 is discussed in more detail below with regard to FIG. 13.

As shown in FIG. 1, server 102 includes online content management system 104. In one or more embodiments, online content management system 104 provides remote content storage to users (e.g., cloud storage). For example, a user with an account associated with online content management system 104 can upload various types of digital content items (e.g., digital photographs, digital videos, PDF files, word processing files, etc.) to online content management system 104. In at least one embodiment, online content management system 104 organizes and stores uploaded digital content items for the user's later viewing and possible download, for instance. Additional details with respect to the online content management system 104 are provided below with reference to FIG. 13.

Also further shown in FIG. 1, and as mentioned above, mobile computing device 106 includes online content management system application 108. In one or more embodiments, online content management system application 108 provides a user with one or more graphical user interfaces that enable the user to use the document enhancement system 100 and/or access online content management system 104. For example, online content management system application 108 can provide one or more interactive graphical user interfaces on a display of mobile computing device 106 that allow a user to cause the document enhancement system to convert a displayed document to an enhanced electronic document. In addition, online content management system application 108 can provide one or more interactive graphical user interfaces on a display of mobile computing device 106 that enable the user to cause mobile computing device 106 to communicate with online content management system 104 to upload digital content items, view digital content items, share digital content items, download digital content items, and so forth. In at least one embodiment, online content management system application 108 also interfaces with a camera associated on mobile computing device 106 in order to capture digital images (e.g., digital photographs).

As will be understood based on the disclosure herein, various functions and processes of document enhancement system 100 can be located on server 102, mobile computing device 106, or both server 102 and mobile computing device 106. In some embodiments, online content management system 104 on server 102 cooperates with online content management system application on mobile computing device 106 to provide the functions and features described herein. Alternatively, the functions and features may be performed solely on mobile client device 108 or solely on server 102 as a particular application of the document enhancement system requires.

Figure 2:
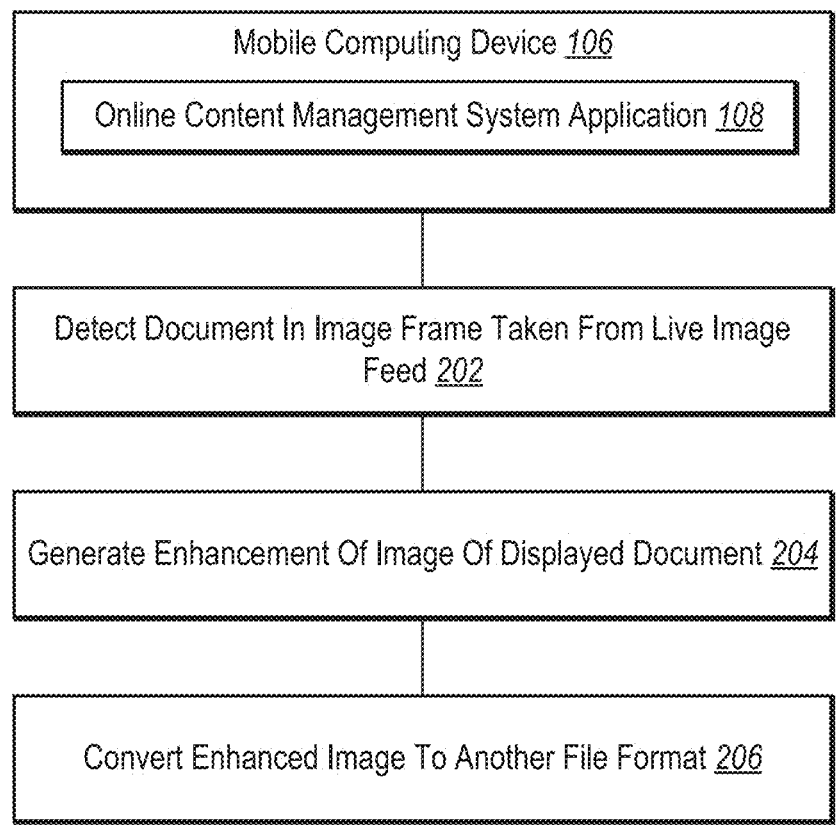
FIG. 2 illustrates an overview schematic diagram for generating an enhanced document image in accordance with one or more embodiments described herein.

FIG. 2 illustrates a sequence diagram for generating an enhanced document image based on a displayed document within an image frame from a live image feed, for instance. As shown in FIG. 2, mobile computing device 106 and/or online content management system application 108 performs an act 202 of detecting a displayed document in an image frame received from a live image feed. For instance, in one or more embodiments, document enhancement system 100 analyzes the received image frame to identify the displayed document. Document enhancement system 100 can utilize a trained neural network to identify the displayed document in the image frame. Additionally or alternatively, document enhancement system 100 can utilize computer vision techniques, machine learning, image space conversions, and so forth in order to identify the displayed document in the image frame.

In some embodiments, the document enhancement system detects a displayed document using a document identification system that determines a boundary of a displayed document in an image feed (e.g., digital camera feed on a mobile device), and provides a boundary indicator corresponding to the boundary of the displayed document within the image feed. For example, in one embodiment, document identification system generates and provides a document boundary indicator outlining the boundaries of a displayed document in an image feed to detect a displayed document within an image frame of an image feed.

Further shown in FIG. 2, the second act 204 includes generating an enhanced document image of the displayed document. As will be described in greater detail below with reference to FIG. 3, generating an enhanced document image of the displayed document includes multiple acts performed by document enhancement system 100. For example, enhancement acts can include cropping the displayed document, rectifying the displayed document, altering colors in the displayed document, removing shadows from the displayed document, correcting background and foreground elements in the displayed document, and so forth. In one or more embodiments, the resulting enhanced document image is clear and easy to read with dark text on a bright white background (e.g., the enhanced document image has a feel and look associated with scanned documents from a flatbed scanner.

As further shown in FIG. 2, the third act 206 includes converting the enhanced document image to an electronic file format. For example, in one or more embodiments, in response to receiving a user selection of an option to convert the enhanced document image, document enhancement system 100 can convert the enhanced document image to a specified file format, such as PDF. In additional embodiments, document enhancement system 100 can convert the enhanced document image to other file formats such as a word processing file format, and so forth. Accordingly, document enhancement system 100 can store the electronic document file of the enhanced document image locally on mobile computing device 106 and/or remotely on server 102 using online content management system 104.

Figure 3:
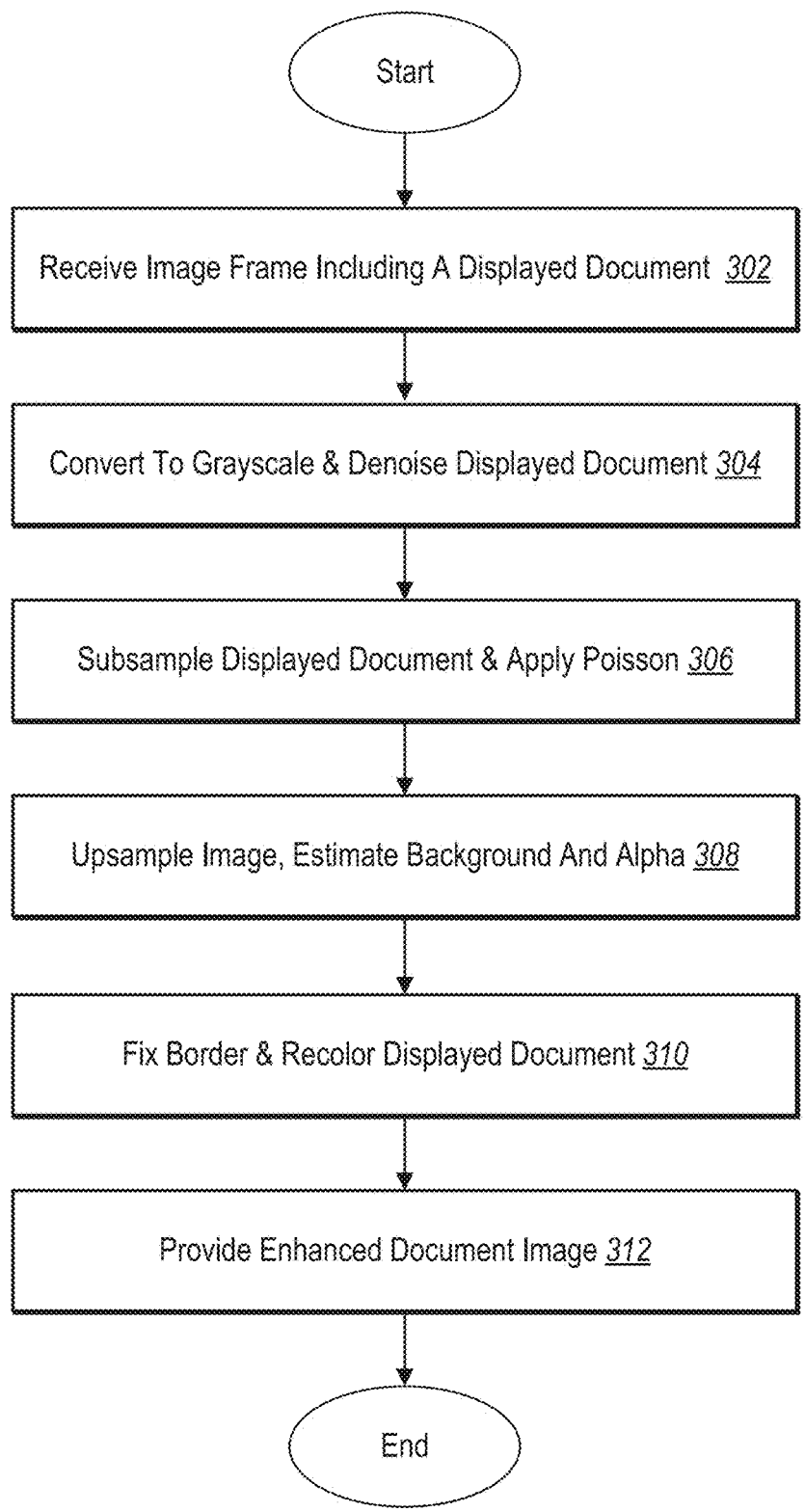
FIG. 3 illustrates a schematic diagram of the document enhancement process in accordance with one or more embodiments described herein.

As mentioned above, in one or more embodiments, generating an enhanced document image (e.g., as in act 204 in FIG. 2) includes multiple acts. For example, FIG. 3 illustrates multiple acts 302-312 in the document enhancement process performed by document enhancement system 100. Although all acts 302-312 are described herein in the order shown in FIG. 3, it will be understood that in additional or alternative embodiments, the document enhancement process may only include a subset of acts 302-312. It will also be understood that in additional or alternative embodiments, the document enhancement process may include part or all of acts 302-312 in a different order than shown in FIG. 3. As illustrated in FIG. 4A, the document enhancement system receives as input an image frame containing displayed document 402, and provides as output enhanced document image 404. As shown in FIG. 4A, displayed document 402 is shadowed with poor contrast that makes the text of the document difficult to read. Accordingly, after the document enhancement process described in greater detail below, document enhancement system 100 outputs enhanced document image 404 that is evenly illuminated, with dark text against a white background.

Referring again to FIG. 3, in at least one embodiment, the document enhancement process begins with act 302 of receiving an image frame including a displayed document. As mentioned above, prior to generating an enhanced document image, document enhancement system 100 detects a displayed document in an image frame from a live image feed (e.g., act 202 in FIG. 2). Accordingly, with the displayed document identified in the received image frame, act 302 of receiving the image frame further includes cropping and rectifying the displayed document from the received image frame.

For example, depending on the circumstances under which a camera associated with mobile computing device 106 captures the image frame, the image frame may contain superfluous background. Accordingly, in at least one embodiment, document enhancement system 100 crops the image frame along the edges of the displayed document to create a standalone image of the displayed document. For instance, document enhancement system 100 detects pixels along the detected edges of the displayed document in the image frame that are likely part of the background of the image (e.g., based on differences in color, etc.), and crops those pixels from the image frame. For ease of explanation, the cropped image of the displayed document will further be referred to as simply the displayed document.

Furthermore, as part of act 302 document enhancement system 100 also rectifies the displayed document. For example, the displayed document may be skewed due to the camera angle when the original image frame was captured (e.g., the edges of the displayed document may not be square or rectangular because the camera was not parallel to the document, or the document was not on a flat surface, etc.). Thus, document enhancement system 100 rectifies the displayed document utilizing geometric transformations to correct any skew or orientation abnormality in the displayed document. For example, as shown in FIG. 4B, there are many scenarios where one to four corners of a displayed document (as indicated by the solid-line quadrilaterals) may be outside an image frame (as indicated by the dashed-line quadrilaterals) due to the angle and/or positioning of the camera relative to the document in the real world when the image frame is captured.

For instance, one case occurs when all four corners of the displayed document are within the image frame. In one or more embodiments, document enhancement system 100 can also rectify the displayed document in additional cases where some number of the displayed document's edges and/or corners are outside of the image frame. For example, when one edge and zero corners of the displayed document are within the image frame, document enhancement system 100 determines if the single edge is the top, bottom, left side, or right side of the displayed document and rotates the displayed document to the correct orientation to preserve the aspect ratio and pixel resolution of the displayed document.

In another example, if the image frame includes two edges and zero corners of the displayed document, document enhancement system 100 determines whether the two corresponding edges are from opposite sides of the displayed document or from adjacent sides. When the edges are from adjacent sides of the displayed document, document enhancement system 100 computes the intersection point at a location outside of the image frame, and then proceeds as though the image frame includes two edges and one corner of the displayed document.

When the edges are from opposites sides of the displayed document, the two displayed document edges meet at a vanishing point (outside the image frame). Thus, document enhancement system 100 applies a projective transformation to send the vanishing point to the appropriate point at infinity (vertical or horizontal). However, without using the interior content of the displayed document, document enhancement system 100 does not have access to a second vanishing point needed to compute the full homography.

Figure 4D:
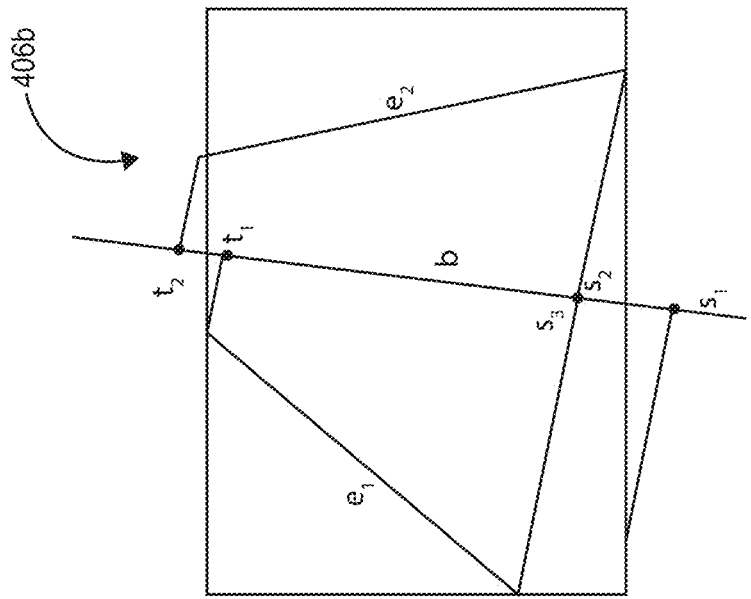
Figure 4C:
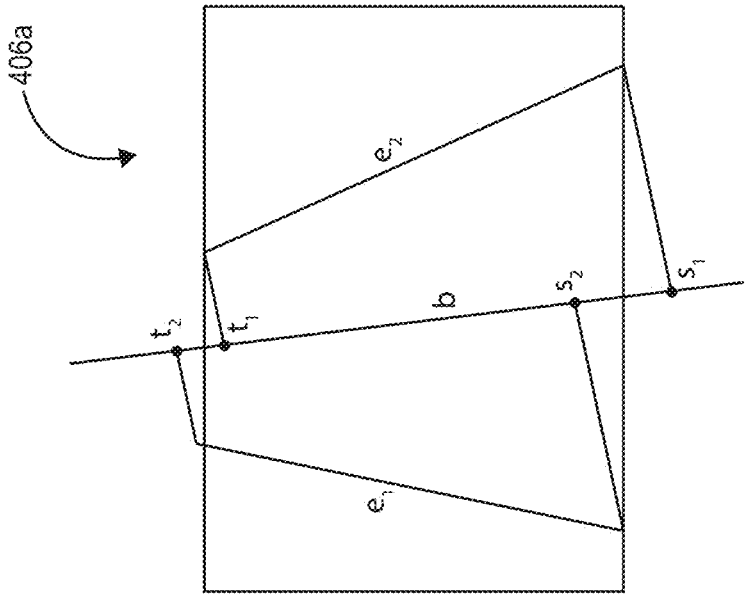

Accordingly, in one or more embodiments, document enhancement system 100 can compute a reasonable estimate to find the edges of the displayed document outside the image frame. For example, FIGS. 4C and 4D show diagrams 406a and 406b representing a displayed document in an image frame from different angles, orientation, and/or camera position. As shown in FIGS. 4C and 4D, the displayed document has edges "e1" and "e2." For example, to identify one or more corners of the displayed document, document enhancement system 100 computes a bisector "b" of the displayed document, given the edges "e1" and "e2." Next, document enhancement system 100 computes the projections (e.g., "s1," "s2," "t1," and "t2") of the endpoints of the edges "e1" and "e2" onto the bisector "b," along with the projection of any image corner that is within the displayed document (e.g., the projection "s3" shown in FIG. 4D).

In at least one embodiment, document enhancement system 100 determines that the extreme points of these projections (e.g., "s1" and "t2") determine the height of the displayed document. To determine the width of the displayed document, document enhancement system 100 first computes the distance between the bisector "b" and the four endpoint projections "s1, "s2," "t1," and "t2," and then takes the average of the smallest distance and the largest distance. Document enhancement system 100 uses the result of this computation as the width of the displayed document.

With the height and width of the displayed document now computed, document enhancement system 100 identifies the coordinates of the corners of the displayed document outside the image frame. For example, the document enhancement system 100 assigns point "s1" as the bottom of the displayed document, and point "t2" as the top of the document. Furthermore, for instance, the document enhancement system 100 uses the determined width of the displayed document to determine corner points projected out from the bisector "b." The intersection of lines "e1" and "e2" with the projected corner points result in the identification or approximation of displayed document corners that are located outside of the image frame.

In another example, if the image frame includes two edges and one corner of the displayed document, document enhancement system 100 may not have enough information to correct the perspective distortion. However, in at least one embodiment, document enhancement system 100 can bring the angle of the corner to ninety degrees using an affine transformation, and aligning the displayed document's edges with the vertical and horizontal directions in the rectified displayed document.

In yet another example, if the image frame includes three edges and zero, one, or two corners of the displayed document, document enhancement system 100 can identify any missing corner simply as the intersection of subsequent edges. For example, on a rectangular displayed document, two of the three edges are the projection of opposite sides of the rectangle, and the third edge is a projection of an orthogonal displayed document edge (e.g., the two sides and the top). Finally, if there are four edges and zero, one, two, three, or four corners of the displayed document shown in the image, document enhancement system 100 utilizes the intersection of pairs of lines to determine the location of all four corners of the displayed document. Finally, if the image includes four edges and zero, one, two, three, or four corners of the displayed document, document enhancement system 100 can determine the location of each missing corner by determining the intersection of adjacent edges of the displayed document.

Referring again to FIG. 3, after receiving the image frame including the displayed document and cropping and rectifying the displayed document, the document enhancement process next includes act 304 of converting the displayed document to grayscale and denoising the displayed document. For example, document enhancement system 100 converts a displayed document to grayscale prior to performing additional enhancements on the image because it is more computationally efficient to enhance a grayscale image, as there are about three times fewer pixels than are found in a color image. Additionally, in at least one embodiment, it is also more computationally efficient for document enhancement system 100 to find and enhance foreground elements in a grayscale document.

In one or more embodiments, document enhancement system 100 changes a displayed document from RGB color to grayscale by converting each pixel in the displayed document to the minimum of the pixel's RGB value. For example, if a pixel from the displayed document is pure red, its RGB value is (255,0,0). Accordingly, in converting this pixel to grayscale, document enhancement system 100 identifies min(255,0,0), which is 0. Thus, document enhancement system 100 determines the pixel's new grayscale value is (0,0,0), or black. In one or more embodiments, document enhancement system 100 continues this conversion on each pixel in the displayed document until the displayed document is fully converted to grayscale.

As mentioned above, act 304 includes denoising the displayed document. Typically, in an image frame of a document captured under low-lighting situations, the darkness in the image frame manifests as spurious texture. For example, a piece of paper in an image frame taken under low-lighting situations may appear to have a gritty surface, even though the piece of paper is smooth and uniform in real-life. Accordingly, document enhancement system 100 denoises the displayed document to rid the background of the displayed document of excess variation (e.g., noise). Denoising the displayed document avoids document enhancement system 100 from treating this spurious texture as something meaningful later in the enhancement process. Thus, document enhancement system 100 denoises the displayed document by cleaning up the background of the displayed document using denoising techniques, while leaving the foreground of the displayed document intact.

Referring again to FIG. 3, after converting the displayed document to grayscale and denoising the displayed document, the document enhancement system 100 performs act 306 of subsampling the displayed document and applying a Poisson equation to the displayed document. For example, in at least one embodiment, document enhancement system 100 subsamples (e.g., down samples) the displayed document by reducing the number of pixels in the displayed document to create a subsampled version of the displayed document. Document enhancement system 100 subsamples the displayed document in order to speed up the processing time associated with the additional procedures in the document enhancement process discussed further below.

In some embodiments, to subsample a displayed document, document enhancement system 100 divides the displayed document into groups of pixel neighborhoods. In at least one embodiment, document enhancement system 100 operates under the assumption constraint that the displayed document is mostly background with some foreground text. Accordingly, in some embodiments, document enhancement system 100 then takes the minimum of a given number of adjoining neighborhoods, and assigns that value to a representative single pixel. When repeated over all pixel neighborhoods in the displayed document, the resulting collection of representative pixels preserves the geometric information from the original displayed document, even though the resolution of the displayed document is greatly reduced.

Figure 4E:
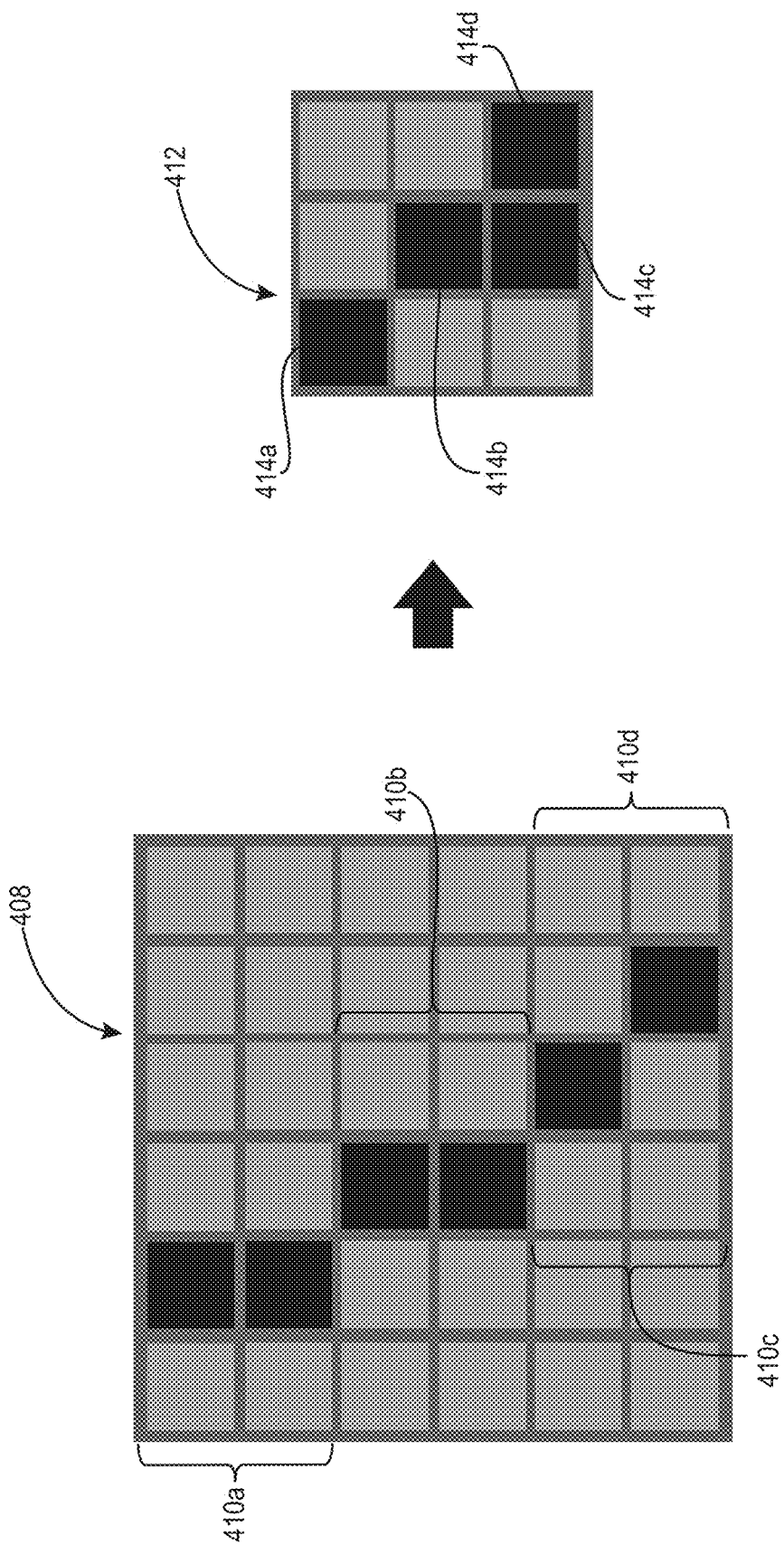

To illustrate the subsample process, FIG. 4E includes a displayed document 408. As described above, document enhancement system 100 divides displayed document 408 into nine 4×4 pixel neighborhoods, examples of which are pixel neighborhoods 410a-410d. Document enhancement system 100 determines the minimum pixel value within each pixel neighborhood, and assigns that value to a representative single pixel in the subsampled image 412. Accordingly, as shown in FIG. 4E, pixel neighborhoods 410a-410d in displayed document 408 correspond to pixels 414a-414d in subsampled image 412. Accordingly, the document enhancement system 100 generates a subsampled version of the displayed document.

Based on the reduced resolution within the subsampled version of the displayed document, document enhancement system 100 can efficiently perform enhancement computations in combination with the subsampled version of the displayed document to create an enhanced document image with a foreground that is crisp and visible with high contrast, and with a background that is nearly a uniform white, or is a uniform white, with even illumination (e.g., uniform gradient). In one or more embodiments, document enhancement system 100 utilizes the Poisson equation to generate the enhanced image with the features described above. For example, the Poisson equation is an objective function that document enhancement system 100 optimizes. In at least one embodiment, document enhancement system 100 solves the following:

Given input image I(x,y),
find output image J(x,y) that minimizes:

$$c_0 \sum_{x,y} |J(x,y)-255|^2 + \left|\frac{\partial J}{\partial x}(x,y) - \frac{\partial I}{\partial x}(x,y)\right|^2 + \left|\frac{\partial J}{\partial x}(x,y) - \frac{\partial I}{\partial y}(x,y)\right|^2$$

In at least one embodiment, document enhancement system 100 associates a penalty when the output of the above equation is not close to (255,255,255), or the RGB value for white. Furthermore, in at least one embodiment, the Poisson equation above also penalizes for any deviation in the horizontal and vertical gradients of the displayed document. Based on optimizing the equation above (e.g., solving for the min), document enhancement system 100 produces a displayed document that is mostly white and with the same gradient as the displayed document in the original image frame.

In light of the potential computational intensity required to optimize the equation above, in at least one embodiment, document enhancement system 100 utilizes a transformation space rather than linear algebra in optimizing the Poisson equation. For example, in at least one embodiment, document enhancement system 100 optimizes the equation above by utilizing a Fourier Transformation. Accordingly, document enhancement system 100 transforms the displayed document into Fourier Domain where document enhancement system 100 solves the Fourier Transformation version of the above objective function. Then, by utilizing inverse Fourier Transformation, document enhancement system 100 outputs the optimized displayed document, albeit still subsampled. The Fourier Transformation simplifies the Poisson equation into a problem that document enhancement system 100 can solve very close to real-time using a mobile computing device.

With the subsampled version of the displayed document now optimized to a mostly white background with the original text in a grayscale foreground, as shown in FIG. 3, the document enhancement system 100 performs the act 308 of upsampling the displayed document to restore the lost resolution, as well as estimating the background and alpha of the displayed document. In one or more embodiments, in order to upsample the displayed document, document enhancement system 100 determines whether each pixel in the subsampled image is foreground or background. Next, document enhancement system 100 assigns each pixel to a pixel neighborhood within the resulting upsampled image. Document enhancement system 100 then labels each pixel within the pixel neighborhood as "foreground," "background," or "unknown" to create a tri-map version of the displayed document. If the pixels in a pixel neighborhood are all either background or unknown, document enhancement system 100 assumes the entire pixel neighborhood is background. Thus, the resulting tri-map version of the displayed document from the upsampled image is a mostly white background with the foreground represented as either "foreground," or "unknown."

For example, as illustrated in FIG. 4F, document enhancement system 100 determines pixel 414a in subsampled version of the displayed document 402 is foreground. Accordingly, document enhancement system 100 labels one pixel in pixel neighborhood 410a in upsampled image 316 as foreground, and labels the other three pixels in pixel neighborhood 410a as unknown. Document enhancement system 100 then repeats this process with pixels 414b-414d and pixel neighborhoods 410b-410d, respectively. Thus, the resulting tri-map version of the displayed document 416 (e.g., the upsampled image) restores much of the resolution lost in the subsampling process.

At this point, there may still be some pixels in tri-map version of the displayed document 416 that have no estimate (e.g., the "unknown" pixels). Accordingly, in one or more embodiments, document enhancement system 100 estimates background for all unknown pixels by processing tri-map version of the displayed document 416 in a pyramid, and continuously down-sampling the displayed document by half until all unknown pixels are given a value. In other words, at some resolution, document enhancement system 100 can estimate a value for all pixels in tri-map version of the displayed document 416. Furthermore, in one or more embodiments, document enhancement system 100 determines an amount of foreground represented by a single pixel by estimating an alpha value for each pixel in tri-map version of the displayed document 416 using simple arithmetic.

Figure 4G:
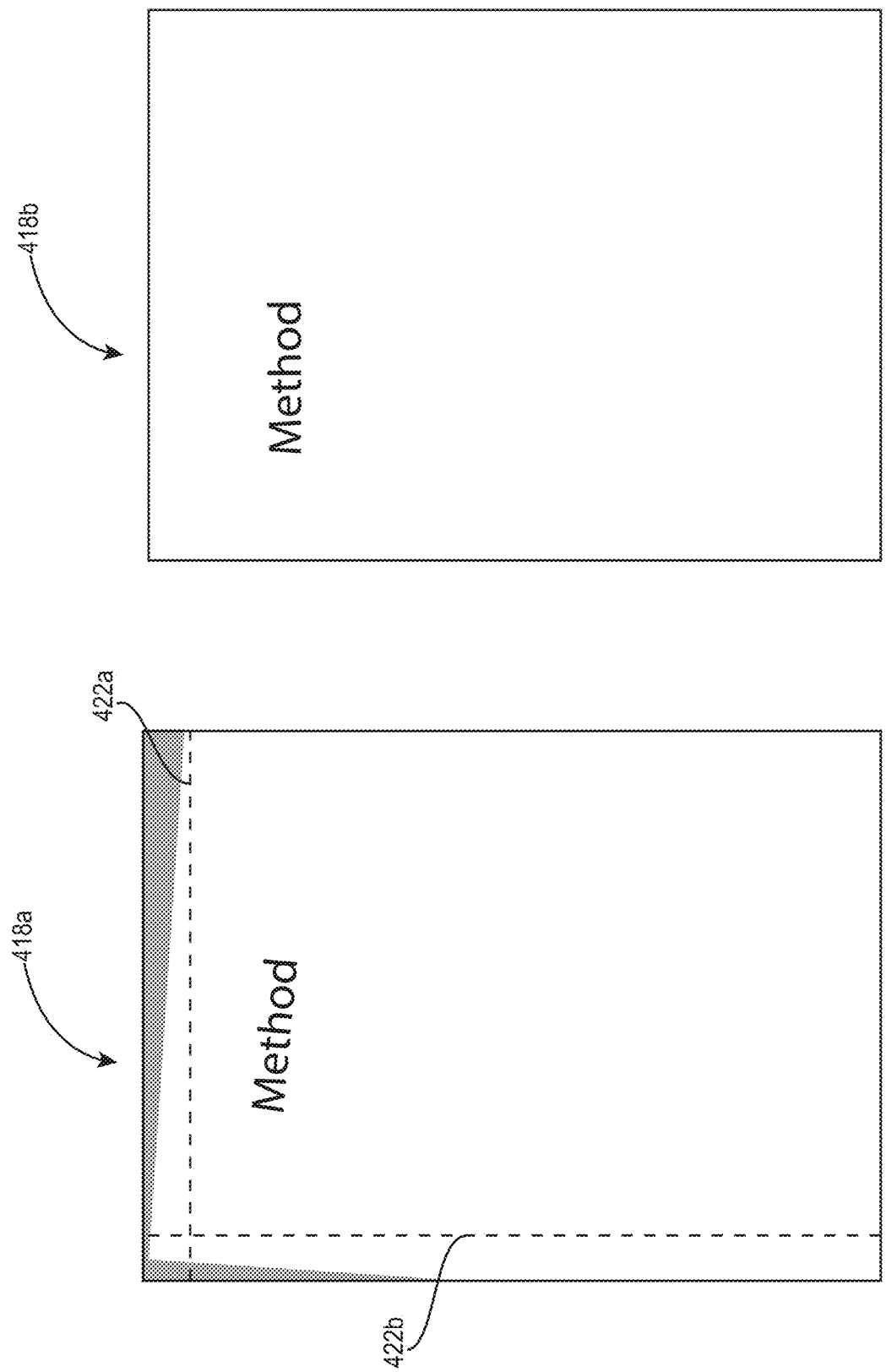

In one or more embodiments, the edges of a displayed document are rarely perfectly rectangular. Accordingly, as shown in FIG. 3, the document enhancement system 100 performs the act 310 of fixing borders. In at least one embodiment, document enhancement system 100 fixes the border of the displayed document by finding a cut along the boundary of the displayed document that goes through the background of the displayed document that will not remove the foreground if the foreground exists only on one side of the cut. For example, as illustrated in FIG. 4G document enhancement system 100 identifies cuts 422a and 422b in displayed document 418a. By cutting along the identified cuts 422a and 422b, document enhancement system 100 is left with displayed document 418b.

Finally, document enhancement system 100 recolors the displayed document, as also shown in act 310 of FIG. 3. As discussed above, to create additional computational efficiency, document enhancement system 100 converts the displayed document to grayscale (e.g., act 304 of FIG. 3) prior to performing various computations in connection with the displayed document. Accordingly, the document enhancement system 100 can recolor the grayscale-displayed document. In one or more embodiments, document enhancement system 100 recolors the displayed document by artificially boosting pre-existing colors to account for the change in background to white.

At this point, the document enhancement process provides an enhanced document image of the original displayed document as an output, as shown in the act 312 shown in FIG. 3. For example, in one or more embodiments, document enhancement system 100 provides the enhanced document image in a preview graphical user interface wherein a user can preview the enhanced document image and perform additional activities in connection with the enhanced document image (e.g., editing, filtering, etc.).

Furthermore, at this point, document enhancement system 100 can easily convert the enhanced document image into a different file format, such as a PDF file. Due to the document enhancement process, the resulting PDF file that is based on the enhanced document image of the displayed document appears as though it was scanned on a flatbed scanner. Furthermore, with the enhanced document image in PDF, document enhancement system 100 can optionally perform additional procedures in combination with the enhanced document image (e.g., optical character recognition, text searching, etc.).

As will be described in more detail below, document enhancement system 100 can facilitate, generate, or otherwise provide one or more graphical user interfaces. For example, document enhancement system 100 can allow a user to interact with a collection of display elements for a variety of purposes in connection with the document enhancement process described above. In particular, FIGS. 5A-5F and the description that follows illustrate various example embodiments of graphical user interfaces and features in accordance with the features and function as described above.

Figure 5A:
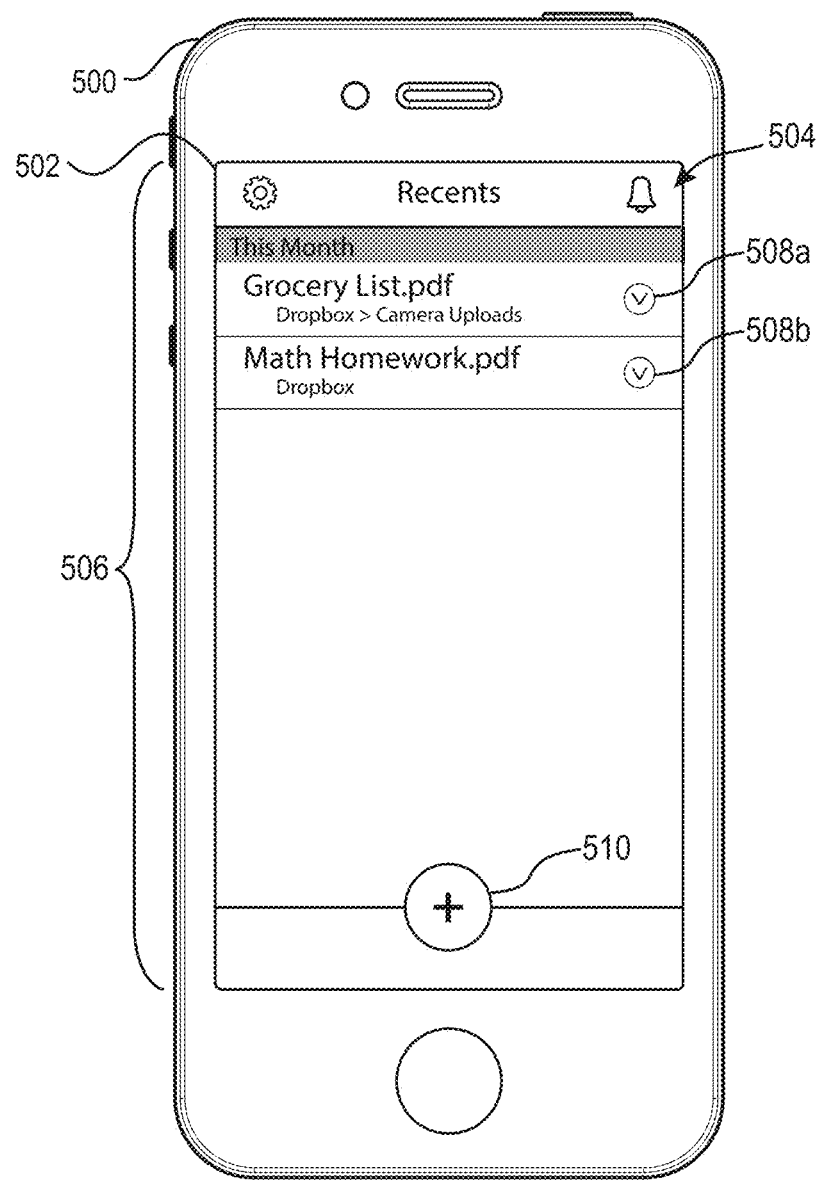
FIGS. 5A-5F illustrate example graphical user interfaces of the document enhancement system in accordance with one or more embodiments described herein.

In one or more embodiments, a mobile computing device can implement part or all of document enhancement system 100. For example, FIG. 5A illustrates mobile computing device 500 (e.g., mobile computing device 106 as shown in FIGS. 1 and 2) that may implement the features and components of document enhancement system 100. As illustrated in FIG. 5A, mobile computing device 500 is a handheld device, such as a smartphone. As used herein, the term "handheld device" refers to a device sized and configured to be held/operated in a single hand of a user. In additional or alternative examples, mobile computing device 500 may be any other suitable client-computing device, such as, but not limited to, a tablet device, a laptop, a smart-wearable device, and/or any other suitable computing device. Any of these computing devices may perform one or more of the processes and/or operations described herein.

Mobile computing device 500 includes any of the features and components described below with reference to computing device 1200 of FIG. 12. For example, as illustrated in FIG. 5A, mobile computing device 500 includes a touch screen display 502 that can display or provide user interfaces and by way of which user input may be received and/or detected. As used herein, a "touch screen display" refers to the display of a touch screen device. In one or more embodiments, a touch screen device may be a computing device with at least one surface upon which a user may perform touch gestures (e.g., a laptop, a tablet computer, a media player, a mobile phone). Additionally, or alternatively, mobile computing device 500 may include any other suitable input device, such as a touch pad, or those described below in reference to FIGS. 12 and 13.

FIG. 5A illustrates touch screen display 502 of mobile computing device 500 displaying one embodiment of a graphical user interface, in particular digital content items GUI 504 of online content management system application 108. As shown, document enhancement system 100 provides various display areas and display elements as part of digital content items GUI 504. In one or more embodiments, digital content items GUI 504 includes digital content item list 506, which in turn includes digital content items 508*a* and 508*b*. In at least one embodiment, digital content items 508*a* and 508*b* are stored by online content management system 104 in association with an account of the user of mobile computing device 500. In response to the user selecting one of digital content items 508*a*, 508*b*, document enhancement system 100 can provide a preview of the selected digital content item and enable the user to further edit the selected digital content item.

Figure 5B:
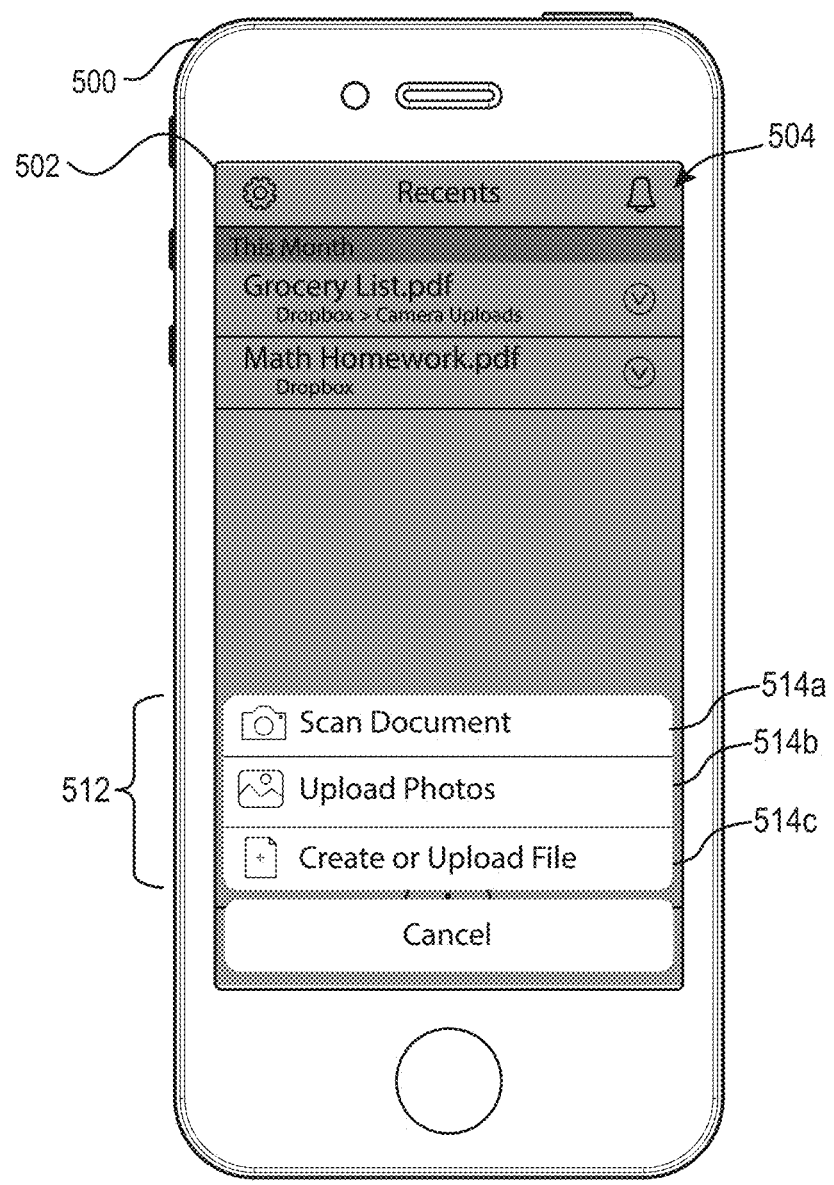

As shown in FIG. 5A, digital content items GUI 504 also includes new digital content item button 510. In response to a selection of new digital content item button 510, document enhancement system 100 provides new digital content item options 512, as shown in FIG. 5B. In one or more embodiments, new digital content item options 512 enable the user to create a new digital content item for storage on the online content management system 104 in a variety of ways. For example, in response to receiving a selection of scan document option 514*a*, document enhancement system 100 can initiate the document enhancement process described above. In response to receiving a selection of the option 514*b* or the option 514*c*, document enhancement system 100 can provide additional GUIs that enable the user to upload a digital photograph or create or upload a digital file.

Figure 5C:
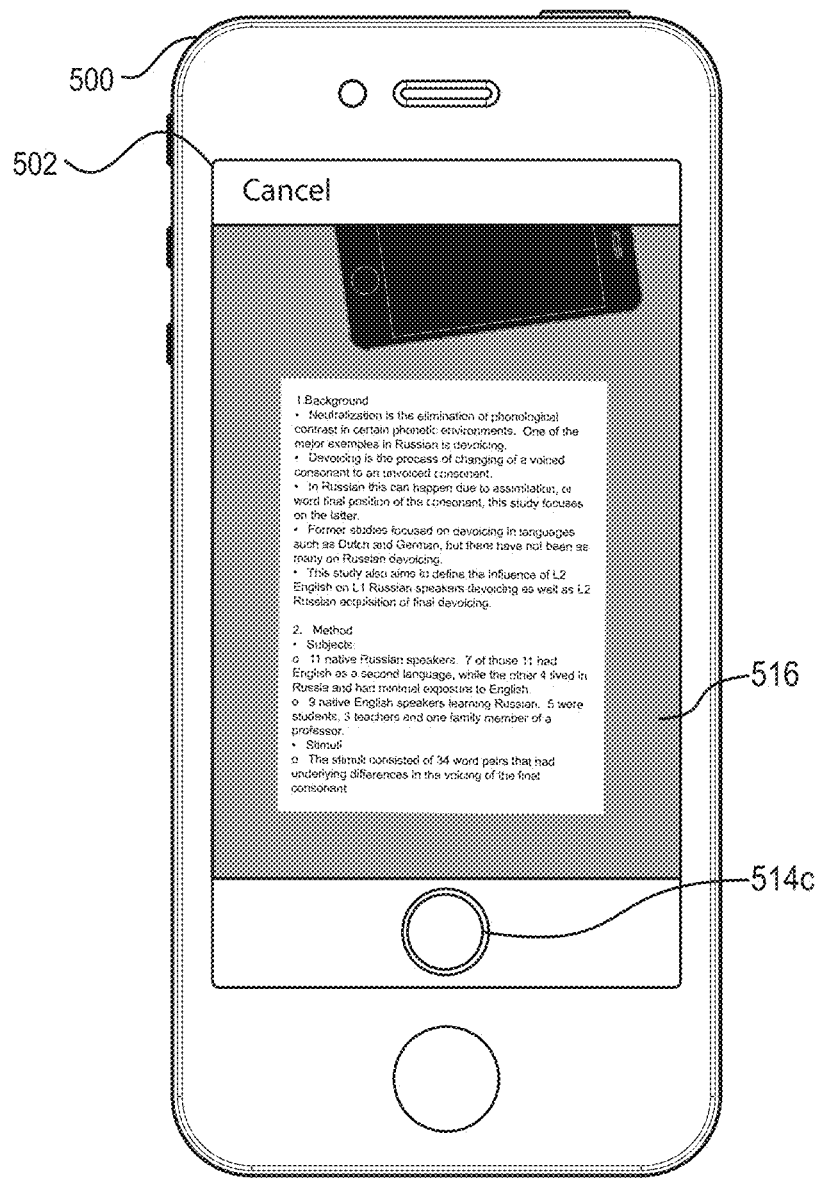

In response to receiving a selection of scan document option 514*a*, document enhancement system 100 provides camera viewfinder GUI 516, as shown in FIG. 5C. In one or more embodiments, camera viewfinder GUI 516 displays a live image feed of that at which a camera of mobile computing device 500 is directed. Using camera viewfinder GUI 516, the user can center the camera of mobile computing device 500 on a document and select shutter button 518. In response to receiving a selection of shutter button 518, document enhancement system 100 receives an image frame from the live image feed shown in camera viewfinder GUI 516. Upon receiving the image frame from the live image feed, document enhancement system 100 initializes the process of detecting the displayed document in the image frame and generating the enhanced document image, as described above.

Figure 5D:
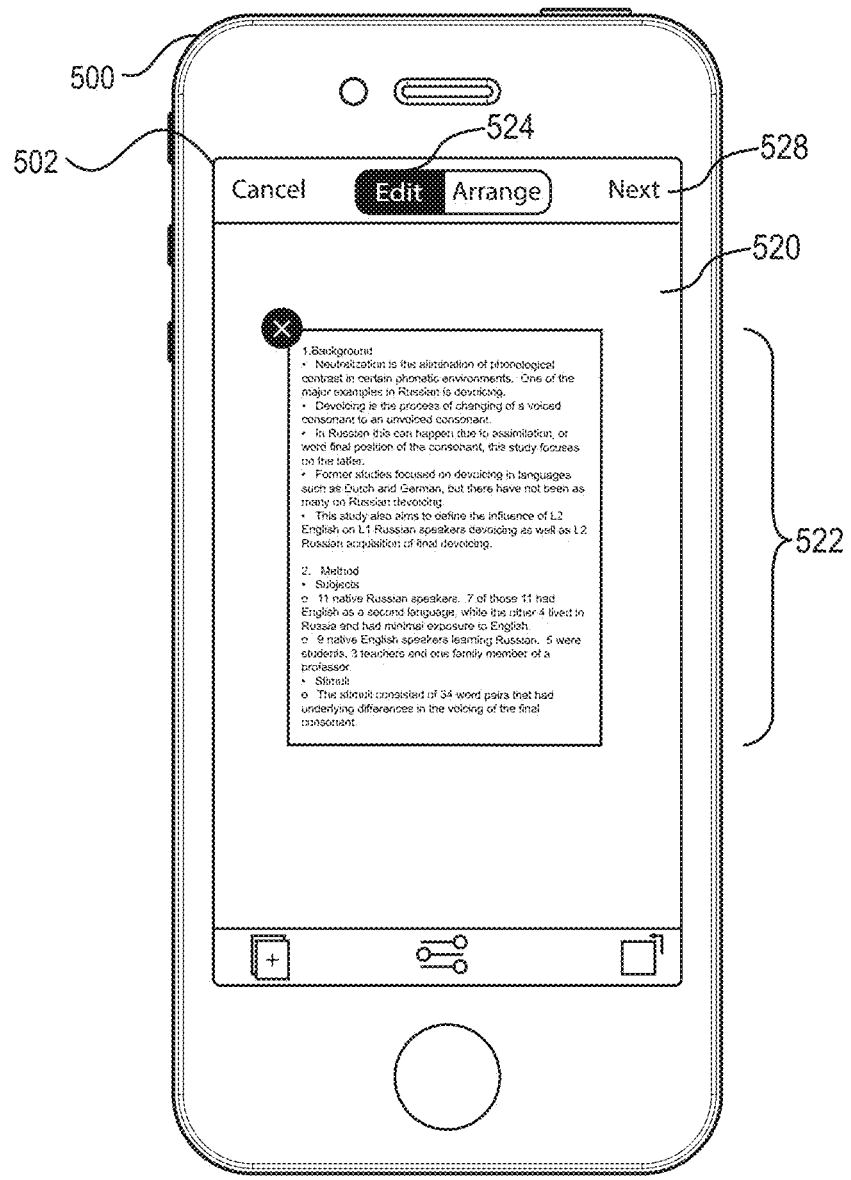

Upon generating the enhanced document image, document enhancement system 100 provides enhanced document image preview GUI 520, as shown in FIG. 5D. For example, as shown in FIG. 5D, enhanced document image preview GUI 520 includes enhanced document image 522. As discussed above, document enhancement system 100 generates enhanced document image 522 in response to modifying, editing, and otherwise correcting an image frame including a displayed document such that the foreground of enhanced document image 522 is dark and clear, while the background of enhanced document image 522 is mostly white with no shadows.

Figure 5E:
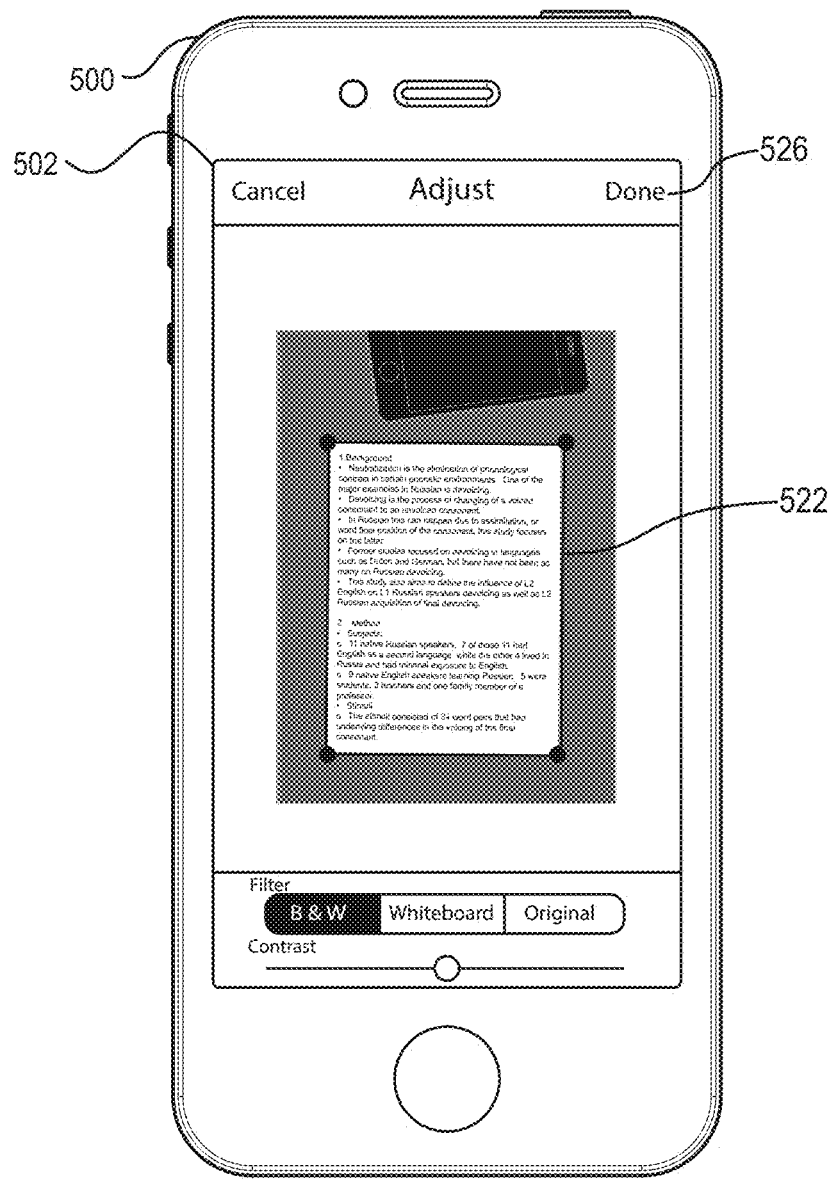

In at least one embodiment, document enhancement system 100 enables the user of mobile computing device 500 to further edit enhanced document image 522. For example, in response to receiving a selection of edit button 524, document enhancement system 100 provides edit GUI 526, as shown in FIG. 5E. Accordingly, in response to receiving interactions with the selectable elements provided in edit GUI 526, document enhancement system 100 can filter enhanced document image 522, resize enhanced document image 522, add contrast to enhanced document image 522, and so forth.

Figure 5F:
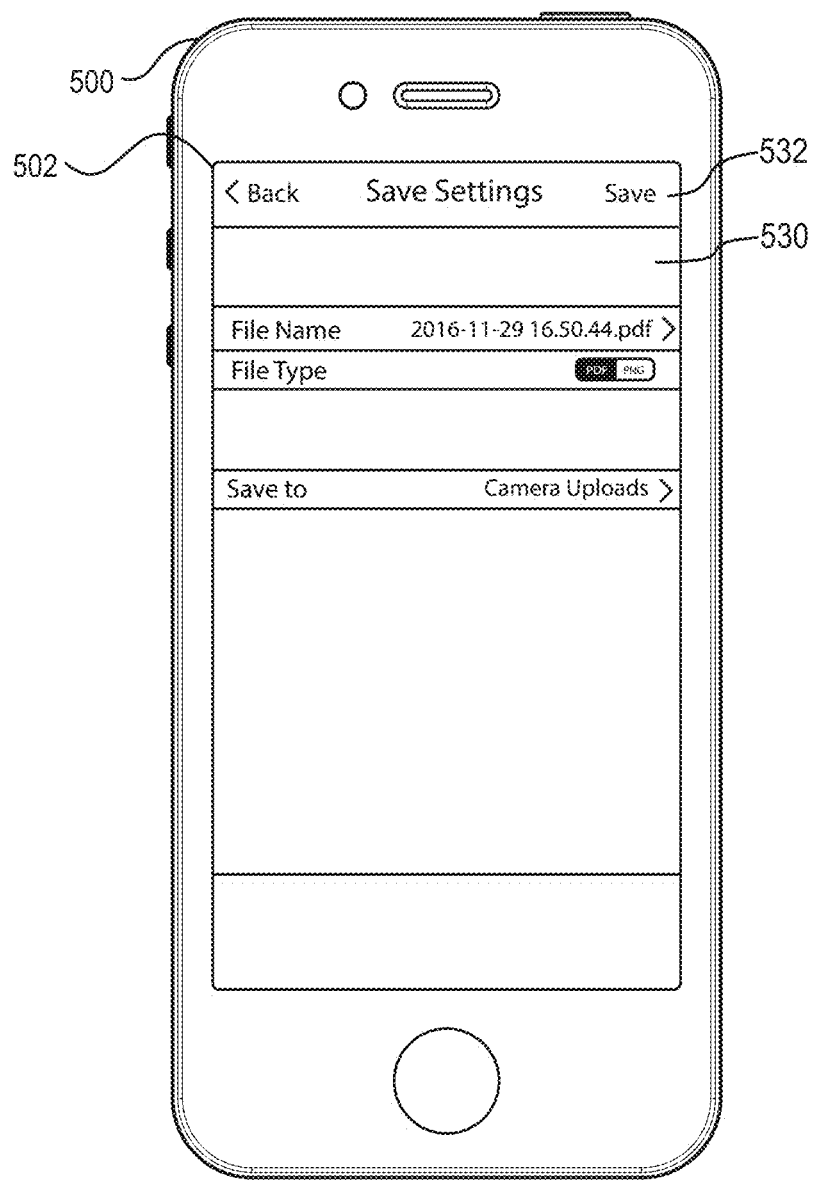

Referring again to FIG. 5D, in response to receiving a selection of next button 528, document enhancement system 100 provides storage configuration GUI 530, as shown in FIG. 5F. In one or more embodiments, storage configuration GUI 530 provides various selectable elements that enable the user to configure how and where the enhanced document image is stored. For example, as shown in FIG. 5F, in response to receiving interactions with the elements of storage configuration GUI, document enhancement system 100 can store the enhanced document image locally or remote, can update the file title of enhanced document image, and can convert the file type of the enhanced document image (e.g., from an image format, such as JPEG, to a document format, such as PDF).

The features and functionality of document enhancement system 100 is described above with regard to FIGS. 1-5F as operating in connection with an image frame captured from a live image feed. As mentioned above, document enhancement system 100 also generates enhanced document images based on stored digital content items. For example, as described above, when installed on mobile computing device 106, online content management system application 108 enables a user to create and store digital content items (e.g., digital photographs, PDF files, etc.) locally and/or remotely. For instance, online content management system application 108 can store a digital content item locally in storage associated with mobile computing device 106. Additionally or alternatively, online content management system application 108 can provide a digital content item to online content manager system 104 on server 102 for remote storage in association with an account of the user of mobile computing device 106.

In one or more embodiments, online content management system 104 includes features of document enhancement system 100 that identify stored digital content items with which the document enhancement process can be applied. For example, online content management system 104 may store any number of digital content items. Despite this, many of the stored digital content items likely do not include a displayed document. For instance, many digital content items may be digital photographs of people, places, animals, and so forth. Thus, document enhancement system 100 cannot apply the document enhancement process to those digital content items because those digital content items do not include a displayed document. Accordingly, prior to applying the document enhancement process to a digital content item that is either stored on online content management system 104 or provided by online content management system application 108, document enhancement system 100 must first determine whether the digital content item is "scannable;" or in other words, whether the digital content item includes a displayed document.

In one or more embodiments, document enhancement system 100 utilizes an image classifier to determine whether a digital content item includes a displayed document. For example, in at least one embodiment, the image classifier is a deep convolutional neural network that receives a digital content item as input, and outputs a determination as to whether the digital content item is "scannable" or "not scannable." In response to determining that the digital content item is "scannable" (i.e., includes a displayed document), document enhancement system 100 can provide additional functionality in connection with the digital content item that enables the document enhancement process to be applied to the digital content item.

Figure 6:
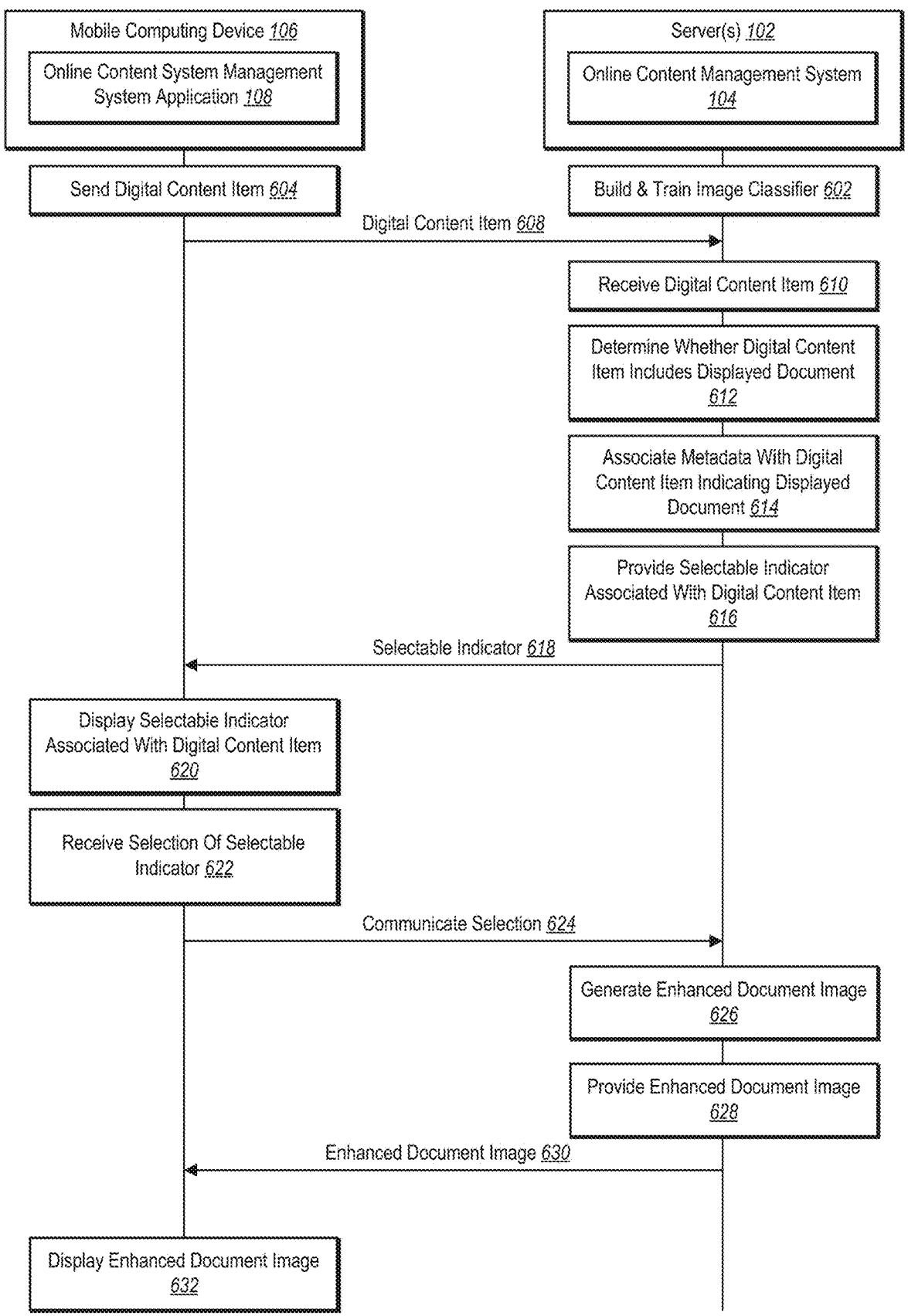
FIG. 6 illustrates a schematic diagram of determining of classifying a digital content item in accordance with one or more embodiments described herein.

The process by which document enhancement system 100 determines whether the document enhancement process can be applied to a digital content item, and subsequently generates an enhanced document image based on the digital content item, is illustrated in FIG. 6. For example, as shown in FIG. 6, the process begins with building and training the image classifier (602) on online content management system 104 on server 102. As mentioned above, in at least one embodiment, the image classifier built, trained, and utilized by document enhancement system 100 is a neural network. As used herein, a neural network is a system, process, or computational structure that uses statistical learning algorithms to estimate unknown functions that may depend on one or more inputs. More specifically, in at least one embodiment, the neural network utilized by document enhancement system 100 is a convolutional neural network. A convolutional neural network is a type of feed-forward back-propagated neural network that the document enhancement system 100 specifically tailors to image recognition problems. In particular, any type of neural network includes a plurality of interconnected "neurons" (e.g., nodes that represent a function) that can compute values from inputs. Generally speaking, each neuron is adaptable and capable of machine learning and/or pattern recognition. As such, in one or more embodiments, document enhancement system 100 can build and train a convolutional neural network representing the image classifier to determine whether an image is scannable or not scannable.

Document enhancement system 100 builds the convolutional neural network representing the image classifier including a plurality of neuron layers. For example, in one or more embodiments, a convolutional neural network can include an input layer having one or more neurons (i.e., such as a node function that accepts an image), one or more hidden layers that each include a plurality of neurons, and an output layer including at least one neuron (i.e., a node function that outputs "scannable" or "not scannable"). In one or more embodiments, the convolutional neural network can have more than one hidden layer within the neural network, in order to add greater processing power and flexibility to the neural network. For instance, example convolutional neural networks can include two, three, four or more hidden layers, wherein each hidden layer includes a plurality of neurons.

Notwithstanding the various types and/or number of neuron layers in a neural network, each neuron of a fully-connected neuron layer is connected to every neuron in an adjacent neuron layer. For instance, in a typical neural network, each neuron in the fully-connected input layer is connected by an edge to each and every neuron in the hidden layer, and each neuron in the fully-connected hidden layer is connected by an edge to each and every neuron in the output layer. Accordingly, data enters the neural network at the input layer and flows through the hidden layer and eventually to the output layer. In alternative types of neural networks, each neuron in a layer of the network may only feed into a subset of neurons in the next layer.

Figure 7A:
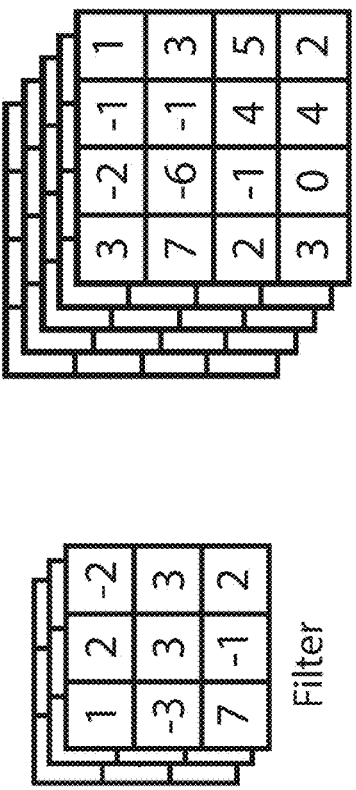

In at least one embodiment, document enhancement system 100 builds the convolutional neural network of at least four layers. For example, in one or more embodiments, these four layers include a convolution layer, a pooling layer, an elementwise nonlinearity layer, and a fully-connected layer. In at least one embodiment, the convolution layer includes a filter that includes the same number of planes as the input and can be overlaid and applied to the values in the input in order to get an output. For example, as shown in FIG. 7A, a convolutional layer of five 3×3 filters applied with a stride of 2 on a 9×9×3 input results in a 4×4×5 output. In the convolutional layer, the parameters are filter weights.

Next, in the pooling layer, document enhancement system 100 defines a "max pool" filter that identifies the maximum value in a region of the input. For example, as shown in FIG. 7B, a 2×2 maximum pooling with a stride of 1 on a 4×4×5 input results in a 3×3×5 output. In at least one embodiment, the pooling layer has no parameters.

Figure 7C:
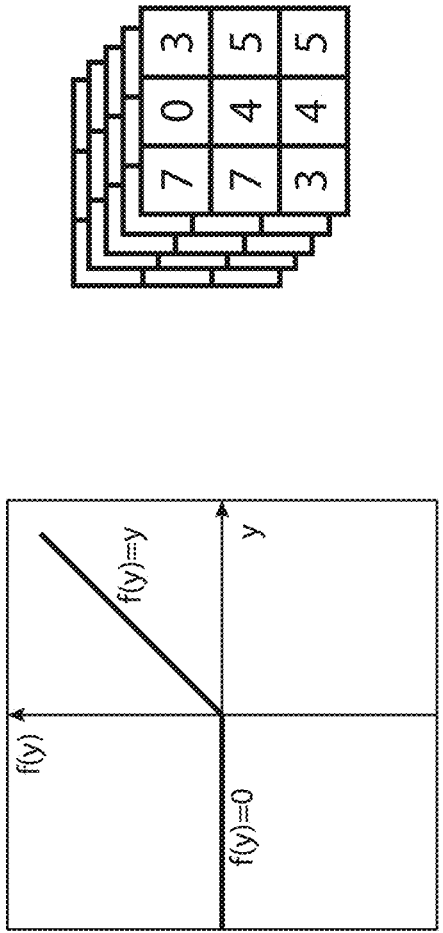

Document enhancement system 100 builds the elementwise nonlinearity layer by applying a nonlinear single variable function to every value in the input in order to get a corresponding value in the output. In at least one embodiment, as shown in FIG. 7C, document enhancement system 100 uses the nonlinear function "Rectified Linear Unit," which reduces negative values to zero while leaving positive values alone. In one or more embodiments, the elementwise nonlinearity layer makes no changes to the dimensions of the input in determining the output and requires no parameters.

Figure 7D:
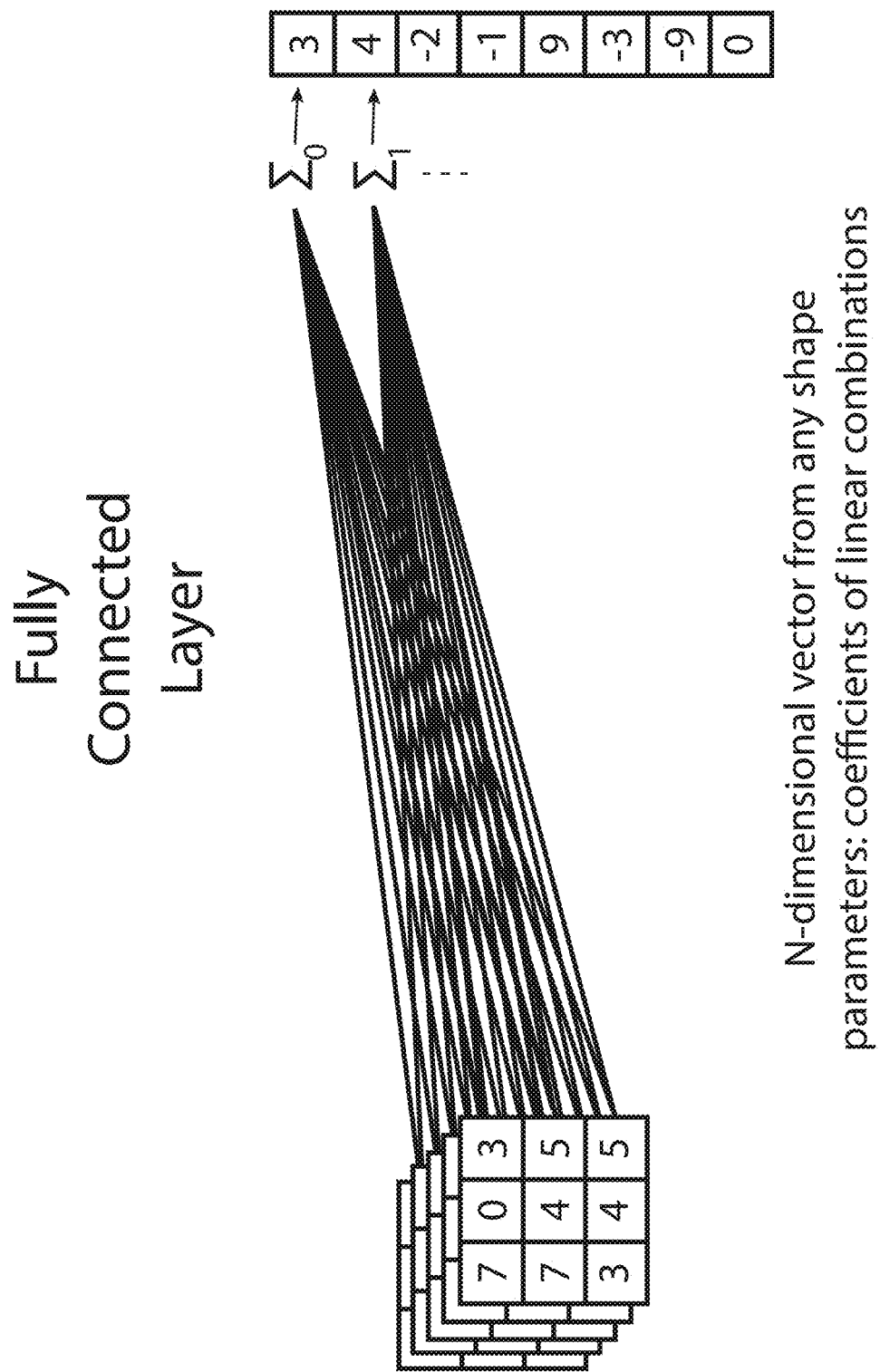

Lastly, document enhancement system 100 builds the fully-connected layer to receive an input of any dimension and output a vector of any length. For example, as shown in FIG. 7D, every cell in the output vector in the fully-connected layer is a linear combination of every value in the input to the fully-connected layer. Thus, the fully-connected layer produces an N-dimensional vector from any shape input while the parameters for the layer are the coefficients of linear combinations. (See e.g., Christian Szegedy et al., Going Deeper with Convolutions, CVPR 2015).

Before document enhancement system 100 can use the convolutional neural network as an image classifier, document enhancement system 100 must train the convolutional neural network to determine whether an image is scannable or not scannable. In other words, whether the image includes a displayed document or not. In at least one embodiment, document enhancement system 100 utilizes a known training set of inputs to perform a feed-forward back-propagation on the convolutional neural networking in order to train the convolutional neural network into providing a known set of outputs that correspond with the known training set of inputs.

In practice, document enhancement system 100 trains the convolutional neural network by first randomly initializing parameters of each layer. Document enhancement system 100 then feeds an example image through the network and compares the output of the network to the expected output for the example image. Next document enhancement system 100 works back through the neural network adjusting parameters within each layer that will push the actual output of the neural network for the example image closer to the expected output. This process is known as back-propagation.

Document enhancement system 100 repeats this process millions of times until the neural network is trained (e.g., consistently provides expected outputs) and therefore capable of functioning as an image classifier. In at least one embodiment, document enhancement system 100 trains the convolutional neural network using an image database of thousands of training images. Furthermore, in one or more embodiments, document enhancement system 100 can utilize outputs of various layers within the convolutional neural network. For example, earlier layers within the convolutional neural network may identify edges and corners allowing document enhancement system 100 to determine with a degree of certainty whether an image contains a quadrilateral (e.g., a likely displayed document). In one or more embodiments, if document enhancement system 100 determines the digital content item likely contains a displayed document, document enhancement system 100 classifies the digital content item as scannable.

Referring again to FIG. 6, after document enhancement system 100 builds and trains the image classifier (602), the document enhancement system 100 waits until a digital content item (608) is sent (604) from online content management system application 108 on mobile computing device 106. In one or more embodiments, document enhancement system 100 utilizes the image classifier in connection with each digital content item received from all users of online content management system 104. In at least one embodiment, document enhancement system 100 classifies each digital content item as soon as it is received. Alternatively, document enhancement system 100 can classify digital content items in batches and/or based on a schedule. In an alternative embodiment, document enhancement system 100 may only classify digital content items of a particular file type (e.g., only JPEGs, GIFs, PNGs).

In response to receiving the digital content item (610), document enhancement system 100 determines whether the digital content item includes a displayed document (612). As discussed above, in at least one embodiment, document enhancement system 100 makes this determination by feeding the digital content item into the image classifier. Document enhancement system 100 determines that the digital content item includes a displayed document in response to the image classifier outputting a "scannable" determination in connection with the digital content item.

Accordingly, in response to determining that the digital content item includes a displayed document (612), as shown in FIG. 6, document enhancement system 100 associates metadata with the digital content item indicating that the digital content item includes a displayed document (614). For example, in one or more embodiments, a digital content item is associated with metadata that describes the digital content item and gives additional information related to the digital content item. Accordingly, document enhancement system 100 can associated metadata with the digital content item (614) such as a tag or line item that indicates that the digital content item includes a displayed document. In at least one embodiment, associating metadata with the digital content item (614) can include updating an existing metadata tag or line item from "unclassified" to "scannable," or similar.

In response to the digital content item metadata that indicates the digital content item includes a displayed document, document enhancement system 100 provides a selectable indicator (618) associated with the digital content item (616) to online content management system application 108 on mobile computing device 106. In at least one embodiment, providing the selectable indicator (618) can include providing an instruction to update a graphical user interface to include the selectable indicator (618). At this point, online content management system application 108 can display the selectable indicator associated with the digital content item (620). For example, in one embodiment, the selectable indicator is a "Save as Scan" button. In response to detecting a selection of the selectable indicator (622), online content management system application 108 communicates the selection (624) to online content management system 104.

At this point, document enhancement system 100 generates an enhanced document image based on the digital content item (626). For example, as described above with reference to FIGS. 2 and 3, document enhancement system 100 generates the enhanced document image by performing the described acts of the document enhancement process in connection with the digital content item (608). Upon generating the enhanced document image (626), document enhancement system 100 provides (628) the enhanced document image (630) to online content management system application 108 on mobile computing device 106. Online content management system application 108 the displays the enhanced document image (632) on a display of mobile computing device 106.

As with FIGS. 5A-5F described above, document enhancement system 100 can facilitate, generate, or otherwise provide one or more graphical user interfaces in connection with generating an enhanced document image of a digital content item. For example, document enhancement system 100 can allow a user to interact with a collection of display elements for a variety of purposes in connection with the document enhancement process described above. In particular, FIGS. 8A and 8B and the description that follows illustrate various example embodiments of the user interfaces and features that are in accordance with general principles as described above.

Figure 8A:
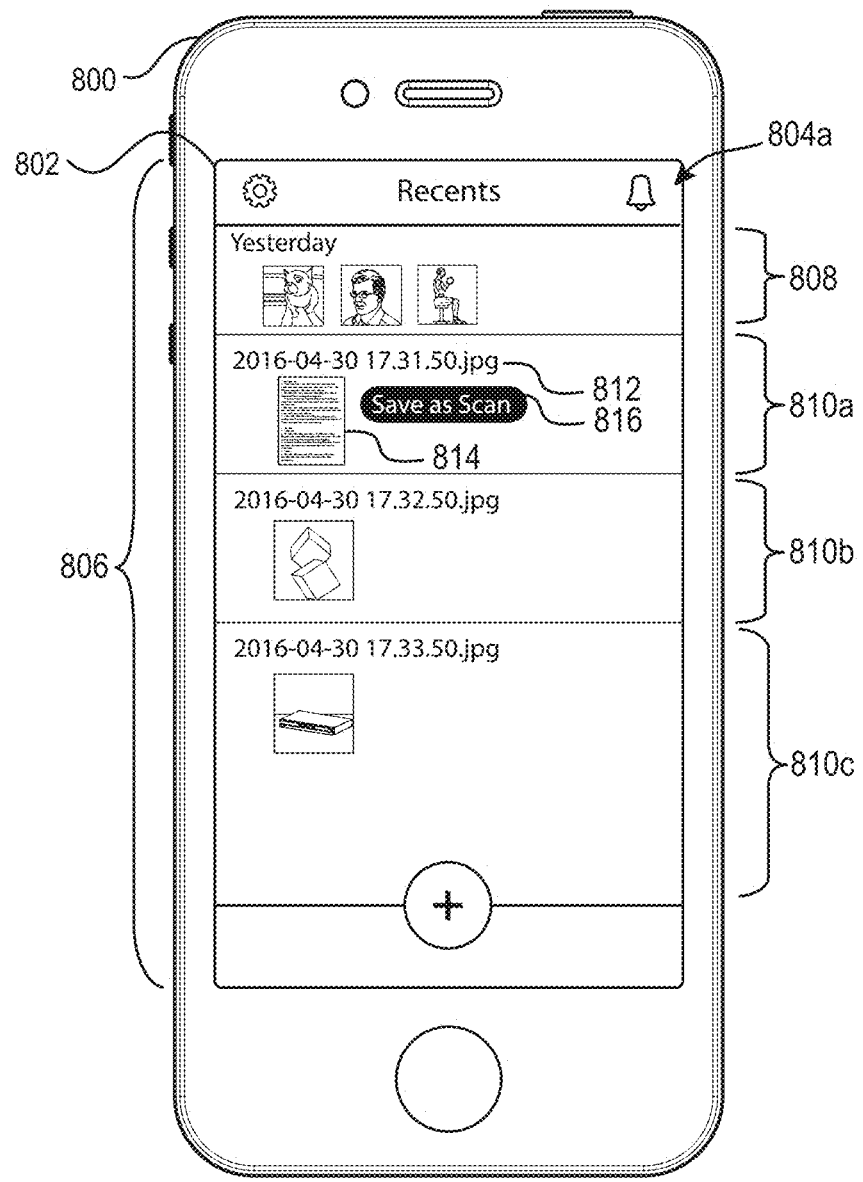
FIGS. 8A-8B illustrate additional graphical user interfaces of the document enhancement system in accordance with one or more embodiments described herein.

As described above, a mobile computing device can implement part or all of document enhancement system 100. For example, FIG. 8A illustrates mobile computing device 800 (e.g., mobile computing device 106 shown in FIGS. 1 and 2) that may implement components of online content management system application 108. FIG. 8A illustrates touch screen display 802 of mobile computing device 800 displaying one embodiment of a graphical user interface, in particular recent content items GUI 804a of online content management system application 108. As shown, document enhancement system 100 provides various display areas and display elements as part of recent content items GUI 804a. In one or more embodiments, recent content items GUI 804a includes digital content item listing 806, which in turn includes recent digital content item preview 808 and digital content items 810a-810c.

Each digital content item 810a-810c is an interactive display object that includes various additional elements. For example, as shown in FIG. 8A, digital content item 810a includes a digital content item title 812 (e.g., the name of the file associated with the content item) and a digital content item preview thumbnail 814. In one or more embodiments, in response to a selection of one of digital content item 810a-810c, online content management system application 108 can provide additional graphical user interfaces that enable the user to inspect, edit, share, and save the content items associated with each of the content item objects 810a-810c.

Further, as shown in FIG. 8A, only digital content item 810a includes a selectable indicator 816 indicating that the digital content item 810a includes a displayed document (i.e., the digital content item 810a is "scannable"). In one or more embodiments, document enhancement system 100 has fed each digital content item 810a-810c through the trained image classifier, as described above, in order to determine which digital content item is "scannable." It follows that because only digital content item 810a includes a displayed document, the image classifier has determined that only digital content item 810a is "scannable."

Figure 8B:
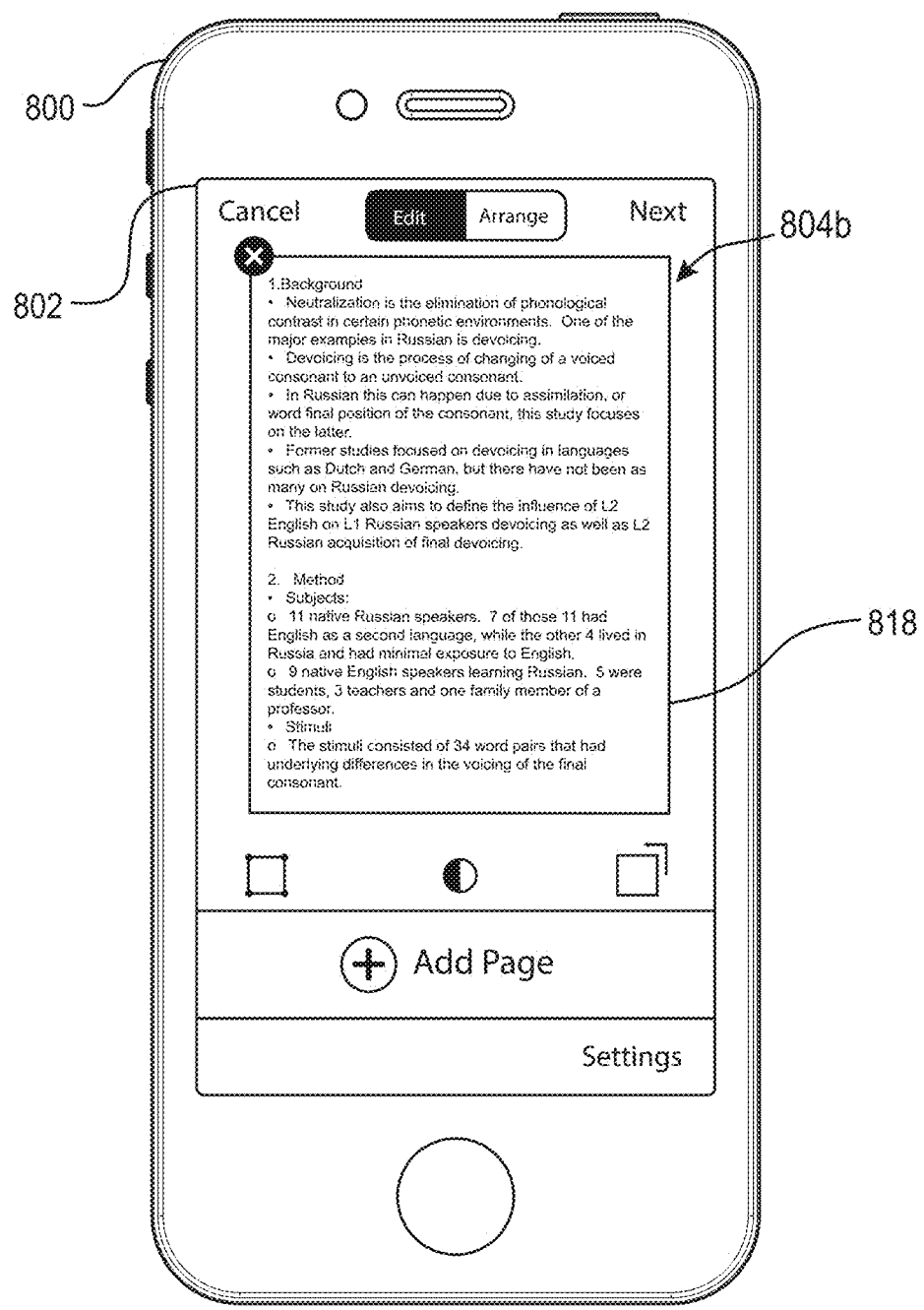

In response to a detected selection of selectable graphical element 816, document enhancement system 100 generates an enhanced document image based on digital content item 810a, utilizing the document enhancement process described above. For example, in response to the selection of selectable graphical element 816, document enhancement system 100 generates enhanced document image 818 in a preview GUI 804b on touch screen display 802 of mobile computing device 800, as shown in FIG. 8B. At this point, the user of mobile computing device 800 can further edit the enhanced document image 818, save the enhanced document image 818, convert the enhanced document image 818, and so forth, as described above.

Figure 9:
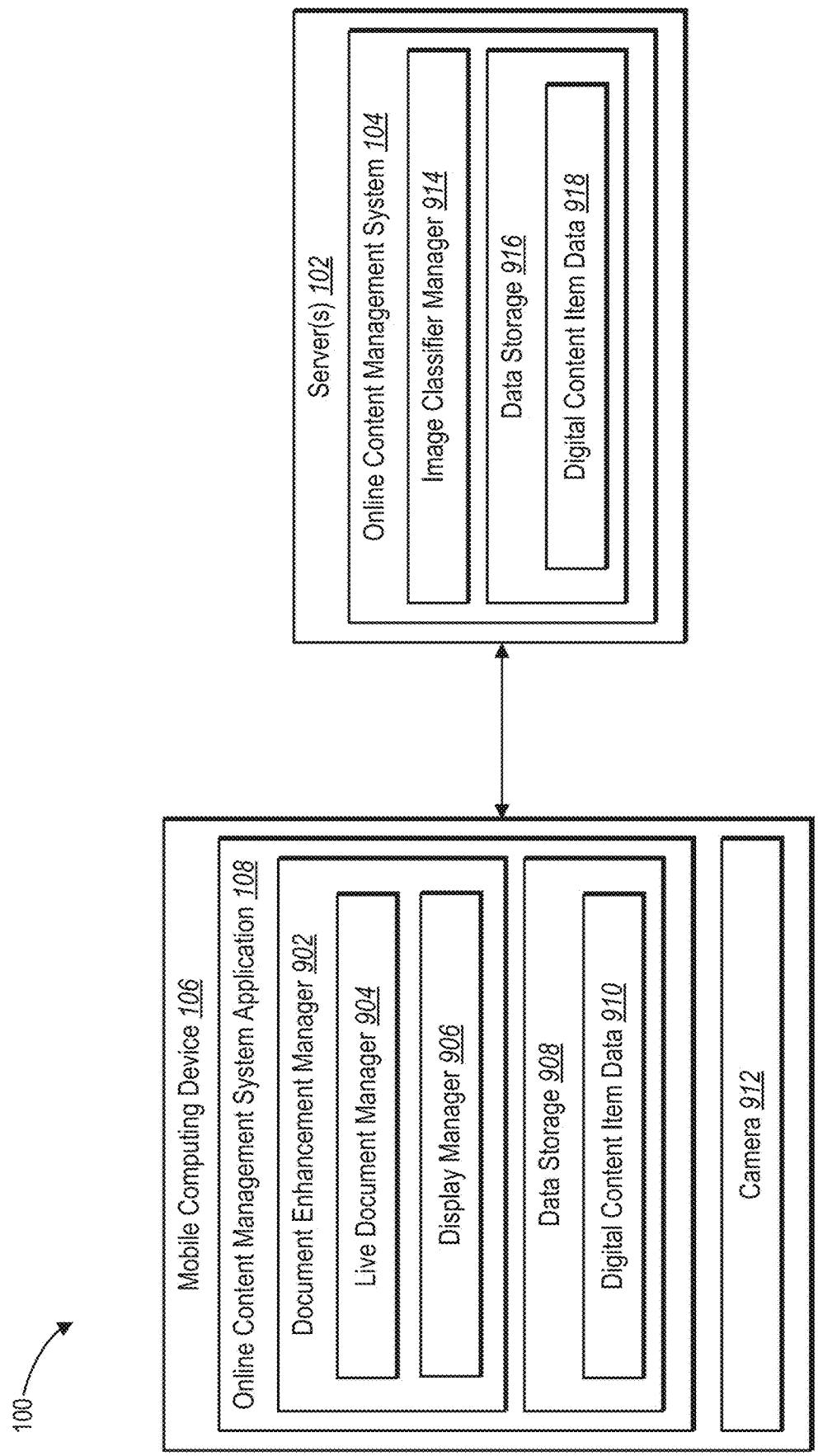
FIG. 9 illustrates a schematic diagram of the document enhancement system in accordance with one or more embodiments described herein.

FIG. 9 illustrates a schematic diagram of document enhancement system 100 in which mobile computing device 106 is in communication with server 102. As shown, mobile computing device 106 includes online content management system application 108, which in turn includes document enhancement manager 902 and camera 912. In one or more embodiments, as shown in FIG. 9, document enhancement manager 902 includes live document manager 904 and display manager 906. As further shown in FIG. 9, online content management system application 108 also includes data storage 908 including digital content item data 910. Additionally, as shown in FIG. 9, server 102 includes online content management system 104, which in turn includes image classifier 914, and data storage 916 including digital content item data 918.

Components 104, 108, and 902-918 can comprise software, hardware, or both. For example, components 104, 108, and 902-918 can comprise one or more computer-executable instructions stored on a computer readable storage medium and executable by one or more processors of one or more computing devices. When executed by the one or more processors, the one or more computer-executable instructions of document enhancement system 100 can cause a computing device(s) to perform the features and methods described herein. Alternatively, components 104, 108, and 902-918 can comprise a special purpose processing device to perform a certain function or group of functions. Additionally, or alternatively, components 104, 108, and 902-918 can comprise a combination of computer-executable instructions and hardware.

Although the features and functionality of document enhancement manager 902 is described in relation to mobile computing device 106, part or all of the features and functionality of document enhancement manager 902 can reside on and be performed by online content management system 104 on server 102. Similarly, although the features and functionality of image classifier 914 is described in relation to online content management system 104 on server 102, part or all of the features and functionality of image classifier 914 can reside on and be performed by online content management system application 108 on mobile computing device 106.

As discussed above, document enhancement manager 902 generates an enhanced document image based on an image frame taken from a live image feed. Accordingly, in one or more embodiments, live document manager 904 handles all tasks related to generating the enhanced document image. For example, as described above, live document manager 904 receives an image frame from a live image feed provided by camera 912 of mobile computing device 106. Further, live document manager 904 also identifies a displayed document in the received image frame and generates an enhanced document image based on the displayed document.

Also shown in FIG. 9, document enhancement manager 902 includes display manager 906. In one or more embodiments, display manager 906 generates and provides graphical user interfaces, interactive elements, and so forth in connection with the document enhancement process, as described above. Online content management system application 108 also includes data storage 908. In one or more embodiments, data storage 908 stores digital content item data 910, which can include information related to digital content items stored locally on mobile computing device 106, as described herein.

Further shown in FIG. 9, mobile computing device 106 includes camera 912. In one or more embodiments, camera 912 can include one or more cameras associated with mobile computing device 106. For example, mobile computing device 106 can include a front-facing camera and/or a rear-facing camera. Furthermore, mobile computing device 106 may be communicatively connected to a peripheral camera (e.g., via a physical connection or a network connection). In at least one embodiment, camera 912 can include a repository of digital photographs and videos stored by mobile computing device 106.

Additionally, as shown in FIG. 9, server 102 includes online content management system 104, which in turn includes image classifier manager 914. In one or more embodiments image classifier manager 914 builds, trains, and applies the image classifier, as described above. Furthermore, Online content management system 104 also includes data storage 916. In one or more embodiments, data storage 916 stores digital content item data 918, which can include information related to digital content items stored remotely on server 102, as described herein.

Figure 10:
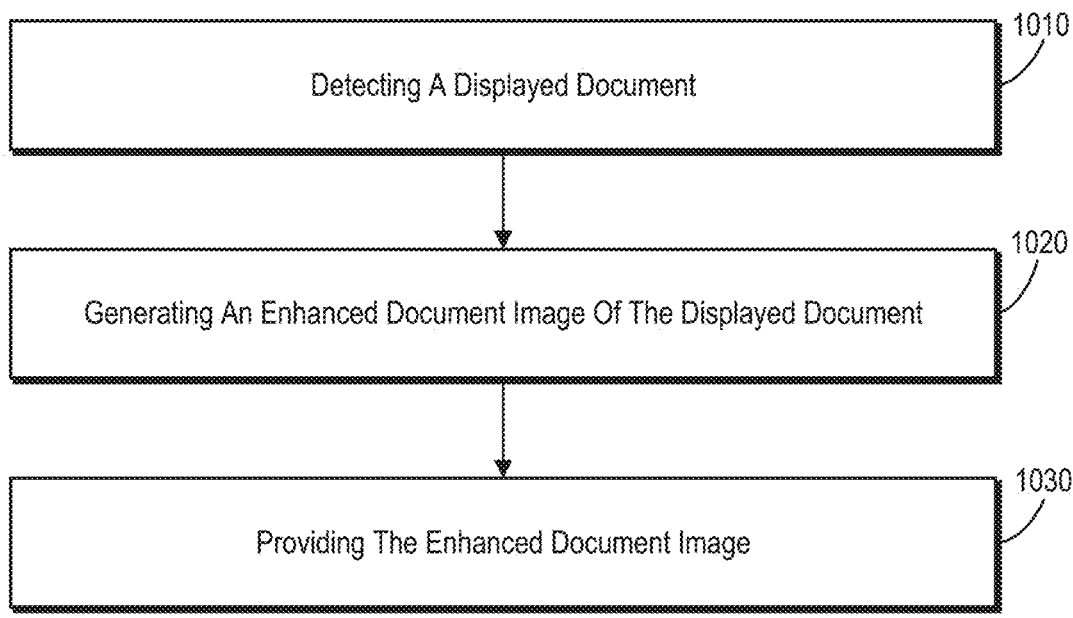
FIG. 10 illustrates a flowchart of a series of acts in a method of generating an enhanced document image in accordance with one or more embodiments described herein.
Figure 11:
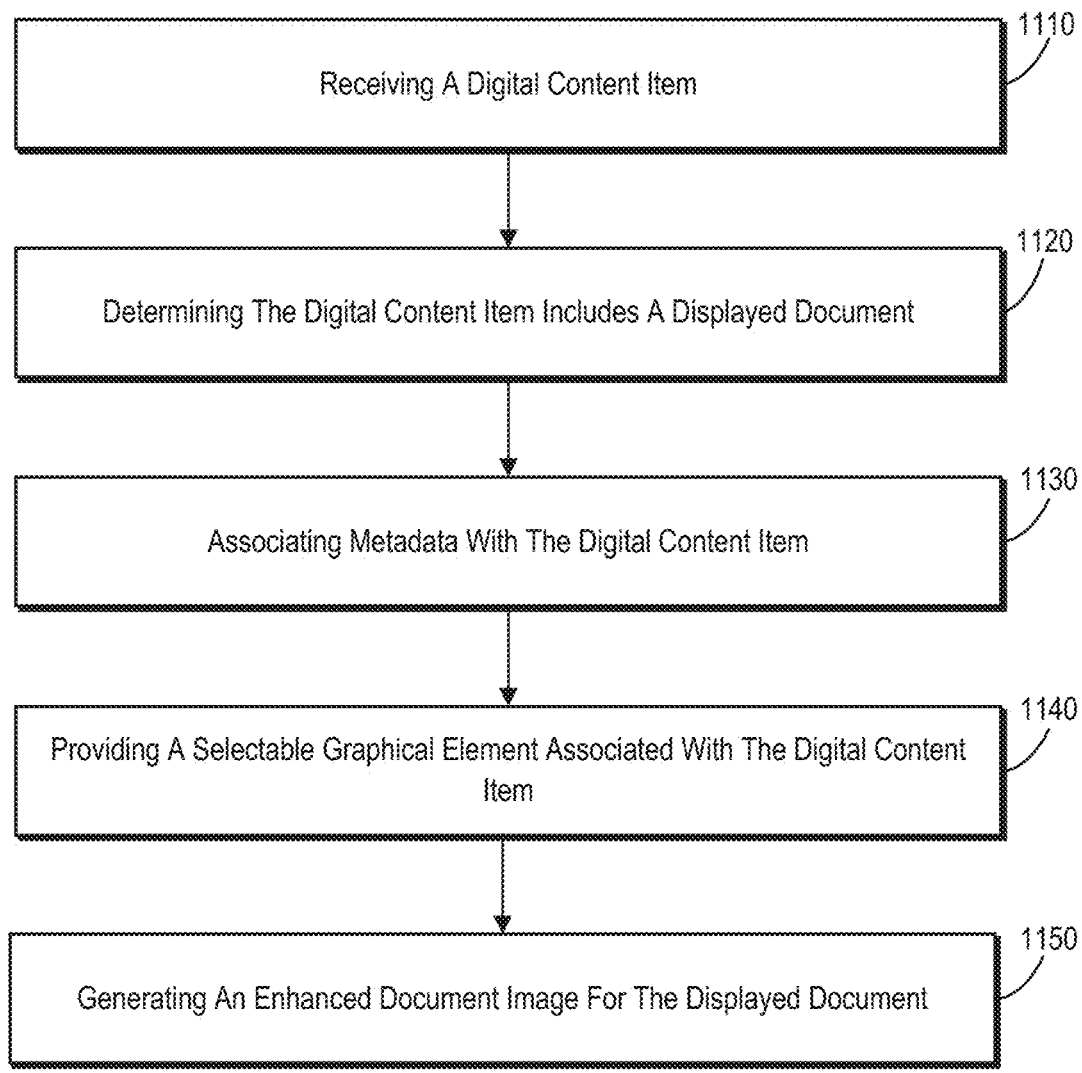
FIG. 11 illustrates a flowchart of a series of acts in a method of generating an enhanced document image in accordance with one or more embodiments described herein.

FIGS. 1-9, the corresponding text, and the examples, provide a number of different systems and devices for generating an enhanced document image. In addition to the foregoing, embodiments of the present disclosure can also be described in terms of flowcharts comprising acts and acts in a method for accomplishing a particular result. For example, FIGS. 10 and 11 illustrates a flowchart of exemplary methods in accordance with one or more embodiments of the present disclosure. The methods described in relation to FIGS. 10 and 11 may be performed with less or more acts/acts or the acts/acts may be performed in differing orders. Additionally, the acts/acts described herein may be repeated or performed in parallel with one another or in parallel with different instances of the same or similar acts/acts.

FIG. 10 illustrates a flowchart of one example method 1000 of generating an enhanced document image based on a displayed document within a live image feed. The method 1000 includes an act 1010 of detecting a displayed document. In particular, act 1010 can involve detecting a displayed document within a live image feed associated with the computing device.

Furthermore, method 1000 also includes an act 1020 of generating an enhanced document image of the displayed document. In particular, act 1020 can involve, based on detecting the displayed document within the live image feed, generating an enhanced document image corresponding to the displayed document. For example, in at least one embodiment, method 1000 further includes an act of capturing an image frame from the live image feed, the image frame comprising the displayed document, wherein generating the enhanced document comprises modifying the image frame with respect to the displayed document within the image frame.

In one or more embodiments, modifying the image frame includes detecting, without receiving user input, portions of the image frame that are not part of the displayed document, and cropping the image frame to remove the portions of the image frame that are not part of the displayed document. Moreover, in at least one embodiment, generating the enhanced document further includes altering the displayed document within the cropped imaged frame. Furthermore, in at least one embodiment, altering the displayed document includes at least one of: rectifying the displayed document, converting the displayed document to grayscale, or denoising the displayed document. In one or more embodiments, altering the displayed document also includes correcting a background of the displayed document. For example, in at least one embodiment, correcting the background of the displayed document includes: creating a subsampled version of the displayed document; and optimizing the subsampled version of the displayed document by solving an objective function that penalizes deviations from white within the subsampled version and penalizes deviations in gradient within the subsampled version to generate an optimized subsampled version.

Additionally, in one or more embodiments, the method 1000 includes acts of performing a Fourier Domain transfer of the subsampled version of the displayed document, solving the objective function of the Fourier Domain, and performing an inverse Fourier Domain transfer to generate the optimized subsampled version of the displayed document. Further, the method 1000 includes an act of upsampling the optimized subsampled version of the displayed document to generate a tri-map version of the displayed document that identifies background pixels, foreground pixels, and unknown pixels. Additionally, the method 1000 includes an act of assigning each of the unknown pixels as either a background pixel or a foreground pixel by estimating the background color of each of the unknown pixels.

Additionally, method 1000 further includes an act 1030 of providing the enhanced document image. In particular, act 1030 can involve provide, for presentation on a display of the computing device, the enhanced document image. In at least one embodiment, method 1000 also includes an act of converting the enhanced document image to a document file format. Additionally, in at least one embodiment, method 1000 further includes an act of, after providing the enhanced document image in a preview graphical user interface, receiving one or more edits to the enhanced document image via an editing graphical user interface. Furthermore, method 1000 can also include an act of editing the enhanced document image in accordance with the one or more received edits.

FIG. 11 illustrates a flowchart of one example method 1100 of generating an enhanced document image based on a digital content item. The method 1100 includes an act 1110 of receiving a digital content item. In particular, act 1110 can involve receiving, from a client-computing device, a digital content item.

Additionally, method 1100 includes an act 1120 of determining that the digital content item includes a displayed document. For example, in at least one embodiment, method 1100 also includes an act of building and training an image classifier, wherein determining that the digital content item includes a displayed document includes applying the image classifier to the digital content item. In that case, building and training the image classifier includes: building a convolutional neural network comprising a plurality of layers, and training, utilizing a training data set, the convolutional neural network to determine whether an image includes a displayed document. In one or more embodiments, building the convolutional neural network including a plurality of layers includes building the convolutional neural network including a convolution layer, a pooling layer, an element-wise nonlinearity layer, and a fully-connected layer.

Furthermore, method 1100 includes an act 1130 of associating metadata with the digital content item. In particular, act 1130 can involve associating, with the digital content item and based on the determination, metadata that indicates the digital content item comprises the displayed document. For example, associating metadata that indicates the digital content item includes the displayed document can include updating a metadata tag associated with the digital content item from an unclassified status to a scannable status.

Method 1100 also includes an act 1140 of providing a selectable graphical element associated with the digital content item. In particular, act 1140 can involve providing, to a client-computing device and based on the metadata associated with the digital content item, a selectable graphical element that the digital content item comprises a displayed document. For example, in one or more embodiments, the selectable graphical element that the digital content item comprises a displayed document includes a graphical user interface button associated with the digital content item in a graphical listing of digital content items.

Furthermore, method 1100 includes an act 1150 of generating an enhanced document image based on the digital content item. In particular, act 1150 can involve, in response to a user selection of the selectable graphical element, generating an enhanced document based on the displayed document within the digital content item. In one or more embodiments, generating an enhanced document based on the displayed document within the digital content item includes subsampling the displayed document, correcting a background of the displayed document, and upsampling the displayed document. In at least one embodiment, generating an enhanced document based on the displayed document within the digital content item further includes, prior to subsampling the displayed document, cropping the displayed document, rectifying the displayed document, converting the displayed document to grayscale, and denoising the displayed document. Furthermore, in at least one embodiment, generating an enhanced document based on the displayed document within the digital content item further includes, after upsampling the displayed document, estimating the background and alpha of the displayed document, fixing the border of the displayed document, and recoloring the displayed document.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
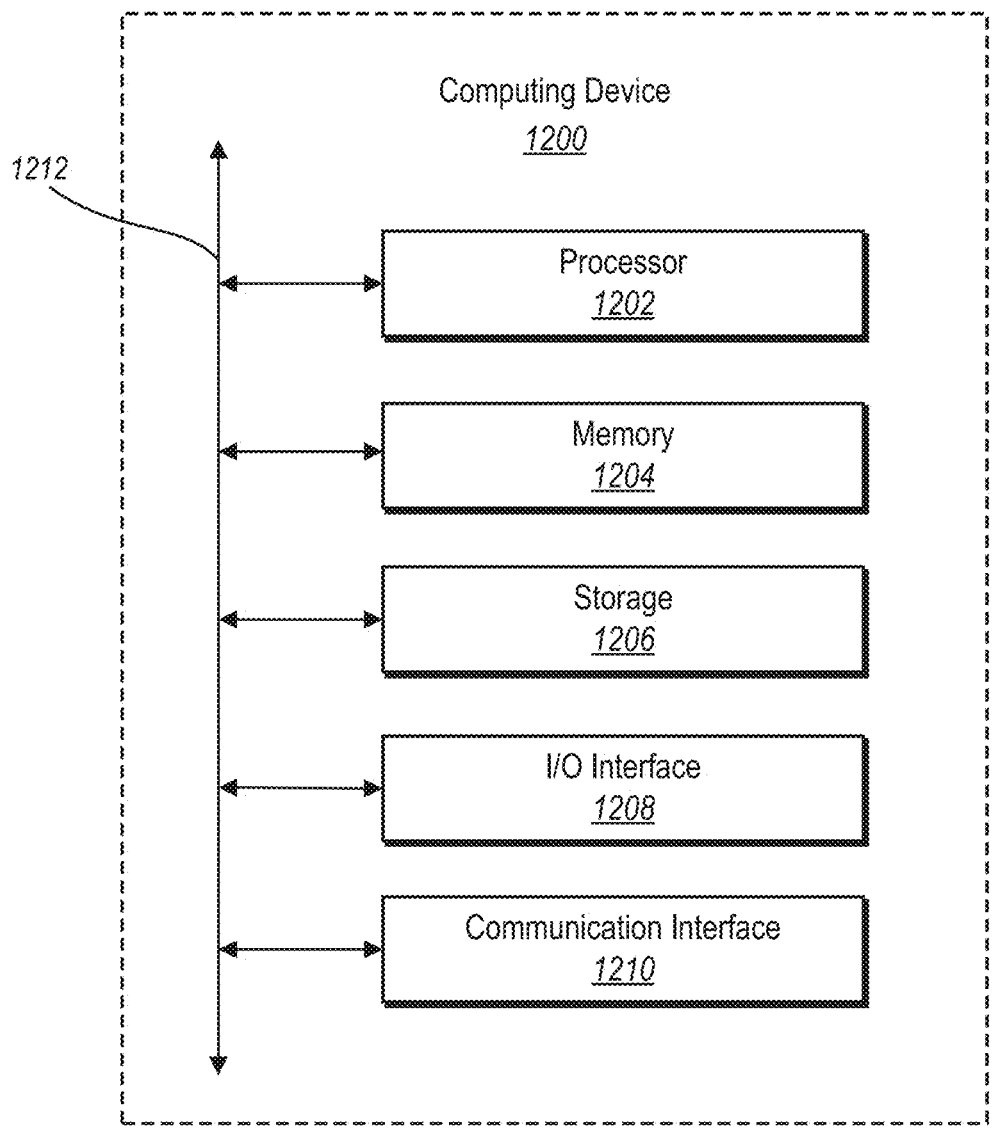
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as computing device 1200 may implement document enhancement system 100 and online content management system application 108. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers ("TLBs"). Instructions in the instruction caches may be copies of instructions in memory 1204 or storage 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive ("HDD"), a floppy disk drive, flash memory, an optical disc, a magneto-optical disc, magnetic tape, or a Universal Serial Bus ("USB") drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, Storage device 1206 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, communication interface 1210 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 1210 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 13:
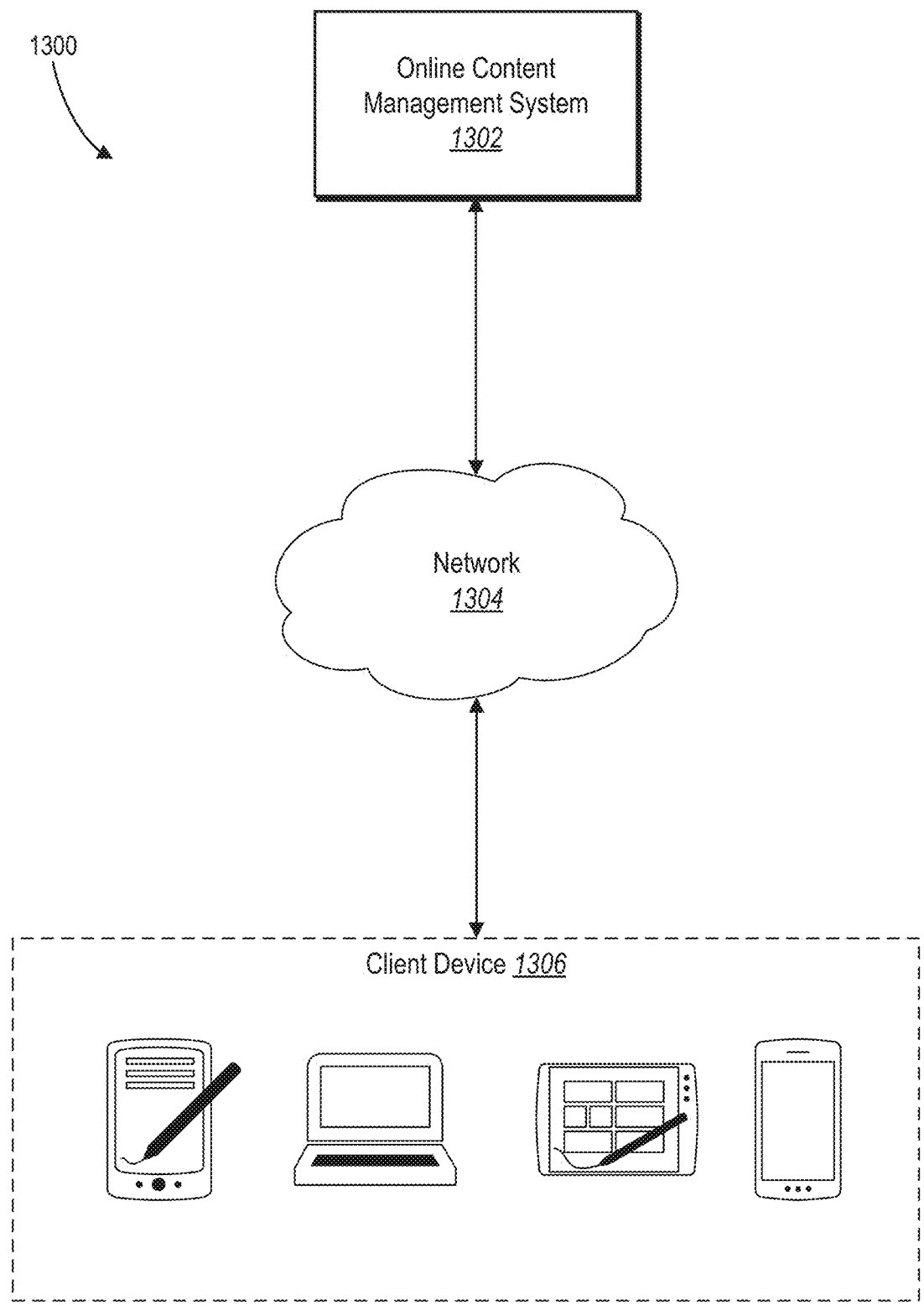
FIG. 13 is an example network environment of a social network management system in accordance with one or more embodiments.

FIG. 13 is a schematic diagram illustrating an online content management system 1302 (e.g., online content management system 104 as shown in FIG. 1) that can work in conjunction with document enhancement system 100. Online content management system 1302 may generate, store, manage, receive, and send digital content items (e.g., electronic documents, eBooks). For example, online content management system 1302 may send and receive electronic documents to and from client devices 1306 by way of network 1304. In particular, online content management system 1302 can store and manage a collection of content items. Online content management system 1302 can manage the sharing of content items between computing devices associated with a plurality of users. For instance, online content management system 1302 can facilitate a user sharing a content item with another user of the document enhancement system 100 and online content management system 1302.

In particular, online content management system 1302 can manage synchronizing content items across multiple client devices 1306 associated with one or more users. For example, user may edit a content item using client devices 1306. The online content management system 1302 can cause client device 1306 to send the edited content item to online content management system 1302. Online content management system 1302 then synchronizes the edited content item on one or more additional computing devices.

In addition to synchronizing content items across multiple devices, one or more embodiments of the online content management system 1302 can provide an efficient storage option for users that have large collections (e.g., galleries) of content items. For example, the online content management system 1302 can store a collection of content items, while the client device 1306 only stores reduced-sized versions of the content items. A user can navigate and browse the reduced-sized versions (e.g., eBook cover art) of the content items on client device 1306. In particular, one way in which a user can experience content items is to browse the reduced-sized versions of the content items on client device 1306. Online content management system 1302 may store any number of reduced size versions (e.g., thumbnails) of digital content items and provide them to client device 1306 at a suitable time (e.g., to allow client device 1306 to emphasize one or more digital content items within a graphical user interface).

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Application for iPhone or iPad or for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access online content management system 1302.

Online content management system 1302 may also include social network components such as a social network management system. A social network management system may generate, store, manage, receive, and send social network communications. For example, the social network management system may send and receive social network communications to and from client devices 1306 by way of network 1304. In particular, the social network management system can store and manage one or more social network communications sent between co-users of a social network. The social network management system can manage the sharing of social network communications between computing devices associated with a plurality of users. For instance, the social network management system can facilitate a user sharing a social network communication with another user of document enhancement system 100.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more acts/acts or the acts/acts may be performed in differing orders. Additionally, the acts/acts described herein may be repeated or performed in parallel with one another or in parallel with different instances of the same or similar acts/acts. The scope of the present application is, therefore, indicated by the appended claims rather than by the foregoing description. All changes that come within the meaning and range of equivalency of the claims are to be embraced within their scope.

What is claimed is:

1. A computing device comprising:
   at least one processor; and
   a non-transitory computer-readable medium storing instructions thereon that, when executed by the at least one processor, cause the computing device to:
   provide a graphical user interface comprising a live camera image feed in response to a user selection of a first option of a set of selectable options, the set of selectable options comprising the first option for scanning a document to a cloud-computing environment and a second option for uploading a file to the cloud-computing environment;
   detect, within the live camera image feed, a displayed document as a visual representation of a physical document;
   in response to detecting the displayed document within the live camera image feed and prior to an image frame capture, provide for display, within the graphical user interface, a live document boundary indicator associated with the displayed document within the live camera image feed;
   detect a user interaction with the graphical user interface while providing the live document boundary indicator associated with the displayed document;
   based on detecting the user interaction while providing the live document boundary indicator, capture from the live camera image feed an image frame that comprises the displayed document and excludes one or more portions displayed in the live camera image feed outside of the live document boundary indicator;
   process the image frame to generate, for upload to a user account in the cloud-computing environment, an enhanced document image corresponding to the displayed document within the live document boundary indicator;
   provide, for presentation on a display of the computing device, the enhanced document image; and
   convert the enhanced document image to a document file format.

2. The computing device as recited in claim 1, wherein generating the enhanced document image comprises modifying the image frame with respect to the displayed document within the image frame.

3. The computing device as recited in claim 2, wherein modifying the image frame comprises:
   detecting, without receiving user input and based on the live document boundary indicator, portions of the image frame that are not part of the displayed document; and
   cropping the image frame to remove the portions of the image frame that are not part of the displayed document.

4. The computing device as recited in claim 3, wherein processing the image frame to generate the enhanced document image further comprises altering the displayed document within the cropped imaged frame.

5. The computing device of claim 4, wherein altering the displayed document comprises at least one of: rectifying the displayed document, converting the displayed document to grayscale, or denoising the displayed document.

6. The computing device as recited in claim 4, wherein altering the displayed document comprises correcting a background of the displayed document.

7. The computing device as recited in claim 6, wherein correcting the background of the displayed document comprises:
creating a subsampled version of the displayed document; and
optimizing the subsampled version of the displayed document by solving an objective function that penalizes deviations from white within the subsampled version and penalizes deviations in gradient within the subsampled version to generate an optimized subsampled version.

8. The computing device as recited in claim 7, wherein the non-transitory computer-readable medium further comprises instructions thereon that, when executed by the at least one processor, cause the computing device to:
perform a Fourier Domain transfer of the subsampled version of the displayed document;
solve the objective function in the Fourier Domain; and
perform an inverse Fourier Domain transfer to generate the optimized subsampled version of the displayed document.

9. The computing device as recited in claim 7, wherein the non-transitory computer-readable medium further comprises instructions thereon that, when executed by the at least one processor, cause the computing device to upsample the optimized subsampled version of the displayed document to generate a tri-map version of the displayed document that identifies background pixels, foreground pixels, and unknown pixels.

10. The computing device as recited in claim 9, wherein the non-transitory computer-readable medium further comprises instructions thereon that, when executed by the at least one processor, cause the computing device to assign each of the unknown pixels as either a background pixel or a foreground pixel by estimating a background color of each of the unknown pixels.

11. A non-transitory computer-readable medium storing instructions thereon that, when executed by at least one processor, cause a computer system to:
provide a graphical user interface comprising a live camera image feed in response to a user selection of a first option of a set of selectable options, the set of selectable options comprising the first option for scanning a document to a cloud-computing environment and a second option for uploading a file to the cloud-computing environment;
detect, within the live camera image feed, a displayed document as a visual representation of a physical document;
in response to detecting the displayed document within the live camera image feed and prior to an image frame capture, provide for display, within the graphical user interface, a live document boundary indicator associated with the displayed document within the live camera image feed;
detect a user interaction with the graphical user interface while providing the live document boundary indicator associated with the displayed document;
based on detecting the user interaction while providing the live document boundary indicator, capture from the live camera image feed an image frame that comprises the displayed document and excludes one or more portions displayed in the live camera image feed outside of the live document boundary indicator;
process the image frame to generate, for upload to a user account in the cloud-computing environment, an enhanced document image corresponding to the displayed document within the live document boundary indicator; and
provide, for presentation on a display of the computer system, the enhanced document image; and
convert the enhanced document image to a document file format.

12. The non-transitory computer-readable medium recited in claim 11, further comprising instructions that, when executed by the at least one processor, cause the computer system to:
receive user input indicating one or more edits to the enhanced document image; and
modify the enhanced document image in accordance with the one or more edits.

13. The non-transitory computer-readable medium recited in claim 11, wherein processing the image frame to generate the enhanced document image comprises altering a border of the displayed document to create a rectangular enhanced document image.

14. The non-transitory computer-readable medium recited in claim 11, wherein generating the enhanced document image comprises:
converting the displayed document from a color version to a grayscale version; and
recoloring the displayed document prior to providing the enhanced document image.

15. A method comprising:
receiving, at an online content management system and from a client device, a digital content item;
determining, by at least one processor, that the digital content item comprises a displayed document;
associating metadata that includes a digital tag or line item with the digital content item that designates the digital content item as comprising the displayed document;
based on the metadata associated with the digital content item, providing a selectable graphical element adjacent to the digital content item in a listing of other digital content items within a graphical user interface on the client device, wherein the selectable graphical element indicates that the digital content item comprises the displayed document and that the digital content item is scannable for conversion of the displayed document from a digital photo file format to a document file format; and
in response to receiving an indication of a user selection of the selectable graphical element, generating an enhanced document image for the displayed document.

16. The method as recited in claim 15, wherein generating an enhanced document image for the displayed document within the digital content item comprises one or more of: cropping the digital content item with respect to the displayed document; rectifying the displayed document; converting the displayed document to grayscale; or denoising the displayed document.

17. The method as recited in claim 15, further comprising:
providing the enhanced document image to the client device; and storing the enhanced document image on the online content management system in an account associated with the client device.

18. The method as recited in claim 17, further comprising: training an image classifier; and wherein determining that the digital content item comprises the displayed document comprises analyzing the digital content item using the trained image classifier.

19. The method as recited in claim 18, wherein building and training the image classifier comprises:

building a convolutional neural network comprising a plurality of layers; and training, utilizing a training data set, the convolutional neural network to determine whether an image includes a displayed document.

20. The method as recited in claim 15, wherein associating the metadata with the digital content item comprises updating a digital tag from indicating that the digital content item is unclassified to indicate a scanability of the digital content item.

* * * * *